(12) United States Patent
Liu et al.

(10) Patent No.: US 12,436,803 B2
(45) Date of Patent: Oct. 7, 2025

(54) DEVICE CONTROL METHOD AND DEVICE

(71) Applicant: HUAWEI TECHNOLOGIES CO., LTD., Guangdong (CN)

(72) Inventors: Banghong Liu, Hangzhou (CN); Quan Gao, Hangzhou (CN); Mingxiu Zhang, Hangzhou (CN); Lu Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 468 days.

(21) Appl. No.: 18/146,516

(22) Filed: Dec. 27, 2022

(65) Prior Publication Data
US 2023/0139886 A1  May 4, 2023

Related U.S. Application Data

(63) Continuation of application No. PCT/CN2021/099781, filed on Jun. 11, 2021.

(30) Foreign Application Priority Data

Jun. 30, 2020 (CN) .......................... 202010617807.5

(51) Int. Cl.
*G06F 9/50* (2006.01)
*G06F 9/451* (2018.01)

(52) U.S. Cl.
CPC ............ *G06F 9/5005* (2013.01); *G06F 9/451* (2018.02)

(58) Field of Classification Search
CPC ........ G06F 9/5005; G06F 9/451; G06F 9/547; G06F 16/433; G06F 8/61; G06F 16/68; G06F 2209/549; H04L 67/34
See application file for complete search history.

(56) References Cited

U.S. PATENT DOCUMENTS

| | | | |
|---|---|---|---|
| 2003/0204730 A1 | 10/2003 | Barmettler et al. | |
| 2004/0177115 A1 | 9/2004 | Hollander et al. | |
| 2012/0232683 A1 | 9/2012 | Master et al. | |
| 2014/0365919 A1* | 12/2014 | Shaw | H04L 12/1822 715/753 |
| 2018/0324575 A1* | 11/2018 | Qi | H04B 5/70 |
| 2019/0068246 A1* | 2/2019 | Zhao | H04B 5/72 |
| 2020/0314486 A1* | 10/2020 | Thoresz | G06F 21/10 |
| 2023/0026777 A1* | 1/2023 | Chen | H04L 67/125 |

FOREIGN PATENT DOCUMENTS

| | | |
|---|---|---|
| CN | 103686540 A | 3/2014 |
| CN | 104093103 A | 10/2014 |
| CN | 109271130 A | 1/2019 |
| CN | 110049125 A | 7/2019 |
| CN | 110139185 A | 8/2019 |

* cited by examiner

*Primary Examiner* — Sisley N Kim

(57) ABSTRACT

This application provides a device control method and a device. Based on a dependency relationship between a first application and a second application, the second application may be installed on a first device, so that the first application may obtain, from a server corresponding to the second application through the second application, a resource for performing a response operation by the device. This not only saves storage space and running space for installing an application on the first device and reduces consumption of traffic for downloading the application, but also reduces costs of an interconnection between a device vendor and an application vendor.

20 Claims, 34 Drawing Sheets

DEVICE CONTROL METHOD AND DEVICE

CROSS-REFERENCE TO RELATED APPLICATIONS

This application is a continuation of International Application No. PCT/CN2021/099781, filed on Jun. 11, 2021, which claims priority to Chinese Patent Application No. 202010617807.5, filed on Jun. 30, 2020. The disclosures of the aforementioned applications are hereby incorporated by reference in their entireties.

TECHNICAL FIELD

This application relates to the field of communication technologies, and in particular, to a device control method and a device.

BACKGROUND

With continuous development of the Internet of Things, hardware device vendors need to consider not only hardware but also software. A sound box is used as an example. In addition to hardware such as Bluetooth and Wi-Fi network connections of the sound box, software such as playing resources and voice interaction of the sound box also needs to be considered. For hardware device vendors with poor software development capabilities, development costs of a service end and a client are high. If software capabilities of other vendors are integrated, interconnection and commissioning processes between the vendors are complex, increasing costs.

SUMMARY

This application provides a device control method and a device. Based on a dependency relationship between a first application and a second application, the second application may be installed on a first device, so that the first application may obtain, from a server corresponding to the second application through the second application, a resource for performing a response operation by the device. This not only saves storage space and running space for installing an application on the first device and reduces consumption of traffic for downloading the application, but also reduces costs of an interconnection between a device vendor and an application vendor.

According to a first aspect, this application provides a device control method. The method includes: A first device sends a first request to a first application process, where the first application process corresponds to a first application, the first application is installed on the first device, and the first request is used to request a resource for making a first response by the first device. The first device sends a second request to a first server in response to the first request, where the second request is used to request to obtain a second application, and the first application is associated with the second application. The first device receives the second application from the first server. The first application process sends a third request to a second application process, where the second application process corresponds to the second application, the first application process and the second application process are different processes, and the third request is used to request a resource for executing the first response by the first device. The second application process sends a fourth request to a server corresponding to the second application, where the fourth request is used to request a resource for executing the first response by the first device. The second application process receives a first resource from the server corresponding to the second application, where the first resource is used by the first device to execute the first response. The second application process sends the first resource to the first application process. The first device executes the first response based on the first resource.

In a possible design, before the first device sends the second request to the first server, the method further includes: The first device determines, based on the fact that an identifier of the second application does not exist in a bundle manager service (Bundle Manager Service, BMS), that the second application is not installed on the first device, where the BMS is used to store an identifier of an application that is installed on the first device.

In a possible design, after the first device receives the second application from the first server, the method further includes: The first device installs the second application on the first device, and stores the identifier of the second application in the BMS.

In a possible design, the first device stores a configuration file of the first application, the configuration file of the first application includes the identifier of the second application, and the second request carries the identifier of the second application.

In a possible design, the method further includes: The first device sends a fifth request to the first server in response to the first request, where the fifth request is used to request to obtain a third application, and the first application is associated with the third application. The first device receives the third application from the first server. The first application process sends a sixth request to a third application process, where the third application process corresponds to the third application, the first application process and the third application process are different processes, and the sixth request is used to request a resource for executing the first response by the first device. The third application process sends a seventh request to a server corresponding to the third application, where the seventh request is used to request a resource for executing the first response by the first device. The third application process receives a second resource from the server corresponding to the third application, where the second resource is used by the first device to execute e the first response. The third application process sends the second resource to the first application process. The first device executes the first response based on the first resource and the second resource. In this way, one application on the first device may be associated with a plurality of applications, and obtain more resources by invoking the second application, to provide abundant resource channels for the first device to perform an operation.

In a possible design, the first device receives a first instruction from a second device, and the first device is communicatively connected to the second device. The first device sends the first request to the first application process in response to the first instruction.

In a possible design, the first device sends the first request to the first application process in response to a first operation of a user.

In a possible design, the method further includes: A display in the first device displays an interface of the first application. The interface of the first application includes a first area, and an interface displayed in the first area is provided by the second application.

In a possible design, the method further includes: The first device releases a resource of the second application. In this way, memory overheads of the first device are reduced.

In a possible design, the method further includes: The first application process stops invoking the second application process. In this way, the second application process may be invoked by another application, so that the second application can be effectively used.

In a possible design, the method further includes: The first device sends an eighth request to a fourth application process, where the fourth application process corresponds to a fourth application, the fourth application is installed on the first device, the fourth application is associated with the second application, and the eighth request is used to request a resource for executing a second response by the first device. The fourth application process sends a ninth request to the second application process, where the fourth application process and the second application process are different processes, and the ninth request is used to request a resource for executing the second response by the first device. The second application process sends a tenth request to the server corresponding to the second application, where the tenth request is used to request a resource for executing the second response by the first device. The second application process receives a third resource from the server corresponding to the second application, where the third resource is used by the first device to execute the second response. The second application process sends the third resource to the fourth application process. The first device executes the second response based on the third resource. In this way, a plurality of applications may be all installed on the first device, and different applications may separately invoke the second application, to separately obtain response resources through the second application, so that the first device can perform different operations.

In a possible design, the first device is a sound box, the first application is a sound box FA application, the second device is a music FA application, and the first server is an FA cloud server. The method specifically includes: The sound box requests to invoke a sound box FA process, where the sound box FA process corresponds to the sound box FA application, and the sound box FA application is installed on the sound box. The sound box determines whether the sound box FA process is run. The sound box invokes the sound box FA process when the sound box FA process is not run, and sends an identifier of a target song to the sound box FA process. The sound box sends an identifier of a target song to the sound box FA process when the sound box FA process is run. The sound box FA process requests to invoke a music FA process. The sound box determines whether an identifier of the music FA application exists in the BMS, to determine whether a bundle of the music FA application exists in the sound box, where the music FA process corresponds to the music FA application, and the BMS stores an identifier of an FA application associated with the sound box FA application. If the identifier of the music FA application does not exist in the BMS, an operating system of the sound box sends, to the FA cloud server, a request for downloading the music FA application, where the request for downloading the music FA application is used to request the bundle of the music FA application, and the request for downloading the music FA application carries the identifier of the music FA application; the operating system of the sound box receives the bundle of the music FA application from the FA cloud server; and the operating system of the sound box installs the music FA application on the sound box by unpacking the bundle of the music FA application, stores the identifier of the music FA application in the BMS, and continues to determine whether the identifier of the music FA application exists in the BMS until the identifier of the music FA application exists in the BMS. If the identifier of the music FA application exists in the BMS, the sound box FA process invokes the music FA process. The sound box FA process sends a first music resource request to the music FA process, where the first music resource request is used to request a music resource of the target song, and the first music resource request carries the identifier of the target song. The music FA process sends a second music resource request to a server corresponding to the music FA application, where the second music resource request is used to request the music resource of the target song, and the second music resource request carries the identifier of the target song. The music FA process receives the music resource of the target song from the server corresponding to the music FA application. The music FA process sends the music resource of the target song to the sound box FA process. The sound box plays the target song based on the music resource of the target song.

According to a second aspect, this application provides a first device, including at least one memory and at least one processor. The memory is configured to store program instructions, and the processor is configured to invoke the program instructions in the memory, to enable an electronic device to perform the device control method according to any one of the first aspect and the possible designs of the first aspect.

According to a third aspect, this application provides a computer-readable storage medium. The computer-readable storage medium stores a computer program. When the computer program is executed by a processor, an electronic device is enabled to implement the device control method according to any one of the first aspect and the possible designs of the first aspect.

According to a fourth aspect, this application provides a computer program product, including executable instructions. The executable instructions are stored in a readable storage medium. At least one processor of an electronic device may read the executable instructions from the readable storage medium, and the at least one processor executes the executable instructions, to enable the electronic device to implement the device control method according to any one of the first aspect and the possible designs of the first aspect.

BRIEF DESCRIPTION OF DRAWINGS

FIG. 5C-1 and FIG. 5C-2 are a signaling flowchart of a device control method according to an embodiment of this application;

FIG. 6B-1 and FIG. 6B-2 are a schematic flowchart of virtually integrating a music FA into a sound box FA according to an embodiment of this application;

DESCRIPTION OF EMBODIMENTS

Figure 1:
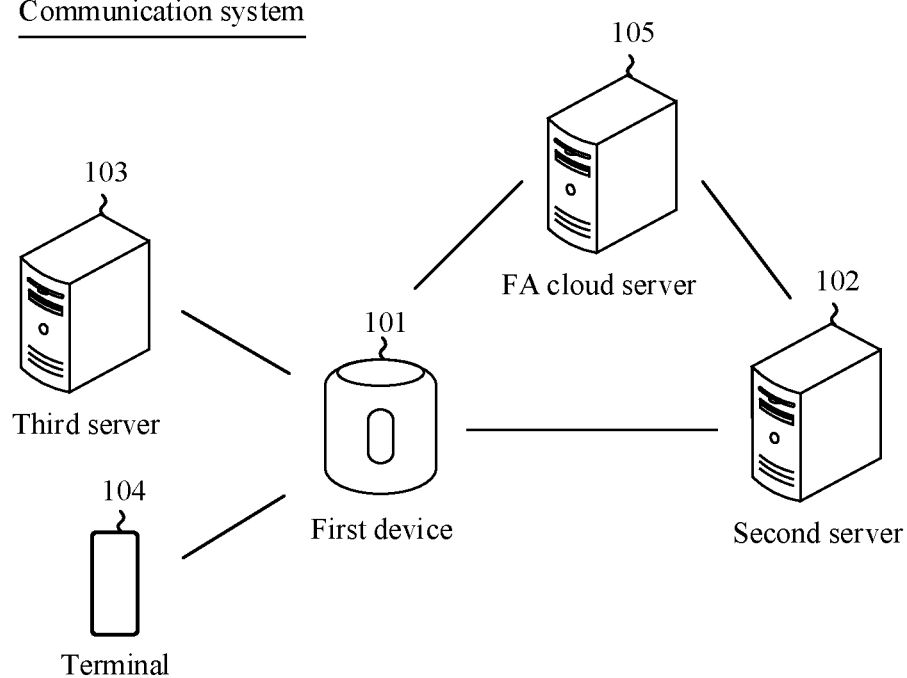
FIG. 1 is a schematic diagram of an architecture of a communication system according to an embodiment of this application.

FIG. 1 is a schematic diagram of an architecture of a communication system according to an embodiment of this application. As shown in FIG. 1, the communication system may include a first device 101 and a second server 102. The first device 101 may request a service resource from the second server 102, and the second server 102 is configured to provide the service resource for the first device 101, so that the first device 101 provides a corresponding service for a user.

The first device 101 and the second server 102 usually belong to different vendors. The first device 101 may include Internet of Things (Internet of Things, IoT) devices such as a sound box, a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, a personal digital assistant (personal digital assistant, PDA), a television, a smart screen, a high-definition television, a 4K television, and a projector. A specific type of the first device 101 is not limited in this application. For ease of description, in this application, an example in which the first device 101 is a sound box is used for illustration, and the second server 102 may be a server that provides a music resource for the sound box.

In some embodiments, still with reference to FIG. 1, the communication system may further include a third server 103. The sound box is connected to the third server 103, and the third server 103 is configured to provide the sound box with a conversion service such as a voice and a resource storage service. The third server 103 and the sound box usually belong to a same vendor.

For example, when the sound box receives an instruction 1 in a form such as a voice operation or an input operation from the user, the sound box may send the instruction 1 to the third server 103, the third server 103 converts the instruction 1 into an instruction 2 that can be recognized by the sound box, and the third server 103 sends the instruction 2 to the sound box, so that the sound box performs a corresponding operation based on the instruction 2. Certainly, a conversion module for voice recognition or the like may be alternatively installed inside the sound box. The sound box may use the conversion module to convert the instruction 1 into an instruction 2 that can be recognized by the sound box, so that the sound box performs a corresponding operation based on the instruction 2.

In some other embodiments, still with reference to FIG. 1, the communication system may further include a terminal 104. An application (application, APP) that can communicate with the sound box may be loaded on the terminal 104. The terminal 104 may directly communicate with the sound box, or may communicate with the sound box by using the third server 103. The terminal 104 may be connected to the sound box in a wired or wireless manner, for example, through Wi-Fi Direct, a Bluetooth connection, or a ZigBee connection. This is not limited in this application.

For example, when the user uses the terminal 104 to send the instruction 1 in the form such as the voice operation or the input operation to the sound box, the terminal 104 may send the instruction 1 to the third server 103, the third server 103 converts the instruction 1 into the instruction 2 that can be recognized by the sound box, and the third server 103 sends the instruction 2 to the sound box, so that the sound box performs the corresponding operation based on the instruction 2. For another example, the terminal 104 may send the instruction 1 to the sound box, and the sound box obtains the instruction 2 by using the conversion module of the sound box or the third server 103, so that the sound box performs the corresponding operation based on the instruction 2. For a specific implementation of the music obtaining instruction 2 herein, refer to the foregoing descriptions. Details are not described herein again.

Figure 2:
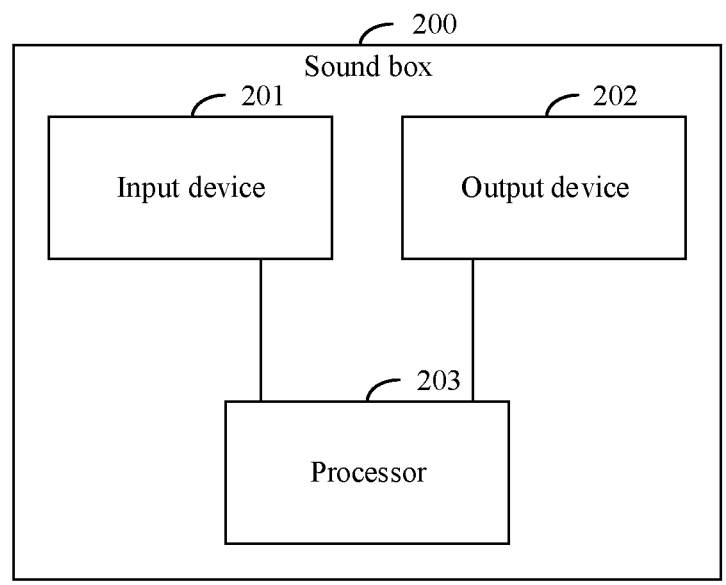
FIG. 2 is a functional block diagram of a sound box according to an embodiment of this application.

FIG. 2 is a functional block diagram of a sound box according to an embodiment of this application. In some embodiments, as shown in FIG. 2, a sound box 200 may include one or more input devices (input devices) 201, one or more output devices (output devices) 202, and one or more processors (processors) 203. The input device 202 may detect various types of input signals (which may be inputs for short), and the output device 202 may provide various types of output information (which may be outputs for short). The processor 203 may receive an input signal from the one or more input devices 201, generate output information in response to the input signal, and output the output information by using the one or more output devices 202.

In some embodiments, the one or more input devices 201 may detect various types of inputs and provide signals (for example, input signals) corresponding to the detected inputs; and then the one or more input devices 201 may provide the input signals for the one or more processors 203. In some examples, the one or more input devices 201 may include any part or component that can detect an input signal. For example, the input device 201 may include an audio sensor (for example, one or more microphones), a distance sensor, an optical or visual sensor (for example, a camera, a visible light sensor, or an invisible light sensor), an optical proximity sensor, a touch sensor, a pressure sensor, a mechanical device (for example, a watch crown, a switch, a button, or a key), a temperature sensor, a communication device (for example, a wired or wireless communication apparatus), or the like, or the input device 201 may be some combinations of the foregoing components.

In some embodiments, the one or more output devices 202 may provide various types of outputs. For example, the one or more output devices 202 may receive one or more signals (for example, output signals provided by the one or more processors 203) and provide outputs corresponding to the signals. In some examples, the output device 202 may include any appropriate part or component configured to provide an output. For example, the output device 202 may include an audio output device (for example, one or more speakers), a visual output device (for example, one or more lights or displays), a tactile output device, a communication device (for example, a wired or wireless communication device), or the like, or the output device 202 may be some combinations of the foregoing various components.

In some embodiments, the one or more processors 203 may be coupled to the input device 201 and the output device 202. The processor 203 may communicate with the input device 201 and the output device 202. For example, the one or more processors 203 may receive an input signal (for example, an input signal corresponding to an input detected by the input device 201) from the input device 201. The one or more processors 203 may parse the received input signal to determine whether to provide one or more corresponding outputs in response to the input signal. If determining to provide the one or more corresponding outputs in response to the input signal, the one or more processors 203 may send an output signal to the output device 202 to provide the output.

It may be understood that the device structure shown in FIG. 2 does not constitute a specific limitation on the sound box. In some other embodiments, the sound box may include more or fewer components than those shown in the figure, or some components may be combined, or some components may be split, or different component arrangements may be used. The components shown in the figure may be implemented by hardware, software, or a combination of software and hardware.

Figure 3:
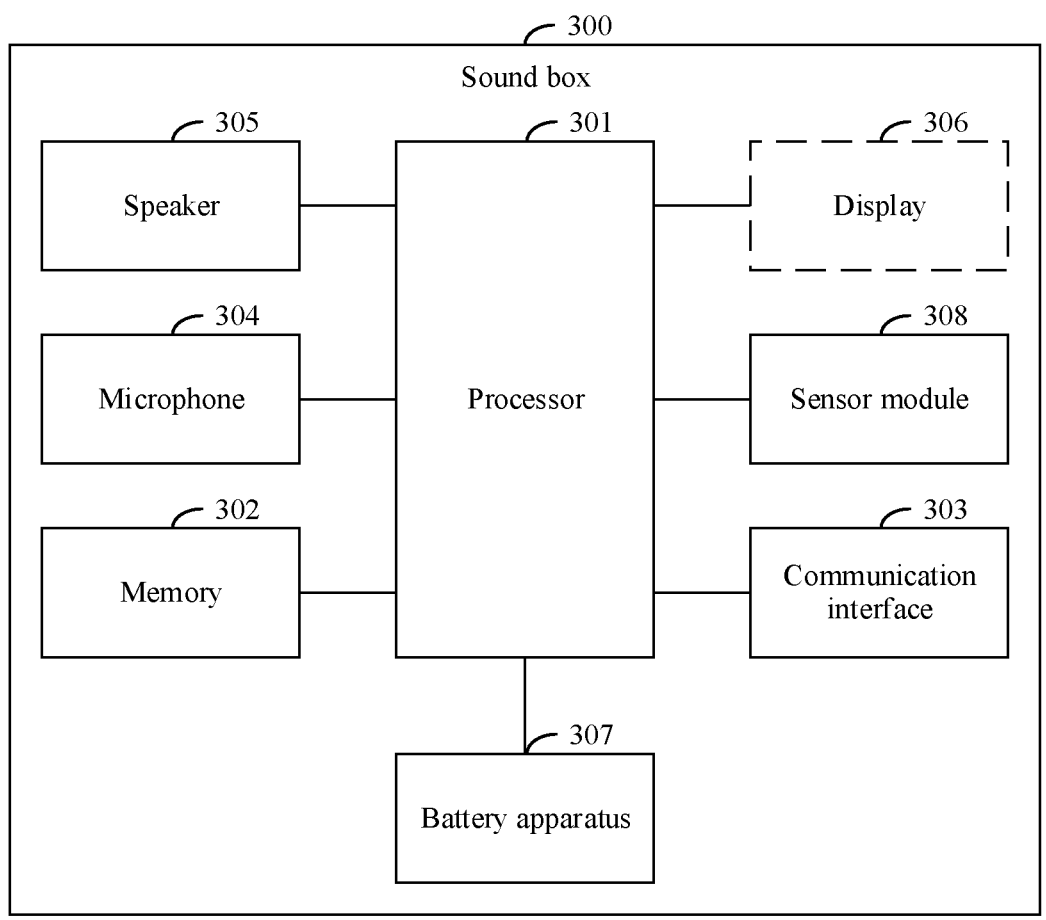
FIG. 3 is a functional block diagram of a sound box according to an embodiment of this application.

FIG. 3 is a functional block diagram of a sound box according to an embodiment of this application. In some embodiments, as shown in FIG. 3, a sound box 300 may include a processor 301, a memory 302, a communication interface 303, a microphone 304, a speaker 305, and the like. These components may perform communication through one or more communication buses or signal cables (not shown in the figure).

The following describes the components of the sound box 300 in detail with reference to FIG. 3.

The processor 301 is a control center of the sound box 300, and is connected to various components of the sound box 300 through various interfaces and lines. The processor 301 performs various functions of the sound box 300 and processes data by running or executing an application stored in the memory 302 and invoking data stored in the memory 302.

In some embodiments, the processor 301 may include one or more processing units. For example, the processor 301 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors. The controller may be a nerve center and a command center of the sound box 300. The controller may generate an operation control signal based on an instruction operation code and a time sequence signal, to complete control of instruction reading and instruction execution. In some other embodiments, a memory may further be disposed in the processor 301, to store instructions and data. In some embodiments, the memory in the processor 301 is a cache. The memory may store instructions or data just used or cyclically used by the processor 301. If the processor 301 needs to use the instructions or the data again, the processor 301 may directly invoke the instructions or the data from the memory. This avoids repeated access and reduce a waiting time of the processor 301, thereby improving system efficiency. The processor 301 may run software code or a module of a device control method provided in some embodiments of this application, to implement a function of controlling the sound box 300.

The memory 302 is configured to store the application and the data. The processor 301 performs various functions of the sound box 300 and data processing by running the application and the data that are stored in the memory 302. The memory 302 mainly includes a program storage area and a data storage area. The program storage area may store an operating system (Operating System, OS), and an application required by at least one function (for example, a sound playing function or a voice collecting function). The data storage area may store data (for example, audio data) created based on use of the sound box. In addition, the memory 302 may include a high-speed random access memory (RAM), and may further include a non-volatile memory such as a magnetic disk storage device or a flash memory, another volatile solid-state storage device, or the like. In some embodiments, the memory 302 may store information such as a "wakeup word". In some other embodiments, the memory 302 may further store audio information (for example, a song, crosstalk, or storytelling). In addition, the memory 302 may store various operating systems. The memory 302 may be independent, and is connected to the processor 301 through the communication bus, or the memory 302 may be integrated with the processor 301.

The communication interface 303 may be a wired interface (for example, an Ethernet interface) or a wireless interface (for example, a cellular network interface or a wireless local area network interface). For example, the communication interface 303 may be specifically configured to communicate with the second server 102 in FIG. 1, is further configured to communicate with another device such as a mobile phone or a television, and is further configured to communicate with the third server 103 in FIG. 1.

In some embodiments, the communication interface 303 may further provide an audio circuit between a user and the sound box. In one aspect, the audio circuit may transmit an audio electrical signal converted from a received audio signal to the speaker 305, and the loudspeaker 305 converts the audio electrical signal into a sound signal for output. In another aspect, the microphone 304 converts a collected sound signal (for example, a voice made by the user) into an electrical signal, the audio circuit receives the electrical signal, converts the electrical signal into audio data (or voice data), and then outputs the audio data. For example, the sound box sends the audio data to the third server 103 in FIG. 1 or the second server 102 in FIG. 1, or outputs the voice data to the memory 302 for further processing.

The microphone 304, also referred to as a "mike" or a "mic", is configured to collect a sound signal (for example, collect a sound made by the user), and convert the sound signal into an electrical signal. In some embodiments, one or more microphones 304, for example, a microphone array, may be disposed on the sound box 300. In some other embodiments, in addition to collecting the sound signal, the microphone 304 may implement a noise reduction function for the sound signal, or may identify a source of the sound signal, implement a directional recording function, and the like.

The speaker 305, also referred to as a "loudspeaker", is configured to convert an audio electrical signal into a sound signal. The sound box 300 may play a sound signal such as music by using the speaker 305.

In some embodiments, the microphone 304 and the speaker 305 are coupled to the processor 301. For example, after receiving a sound signal, the microphone 304 sends the sound signal or an audio electrical signal converted from the sound signal to the processor 301. The processor 301 determines whether to execute a response to the sound signal or the audio electrical signal. If determining to execute the response, the processor 301 outputs a corresponding output signal, for example, plays music through the speaker 305.

In addition, the sound box 300 may include a display 306, or may not include a display 306. The display 306 may be configured to display a display interface of an application, for example, a currently played song. The display 306 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, a touch sensor may be disposed on the display 306 to form a touchscreen. This is not limited in this application. The touch sensor is configured to detect a touch operation performed on or near the touch sensor. The touch sensor may transfer the detected touch operation to the processor 301 to determine a type of the touch event. The processor 301 may provide a visual output related to the touch operation through the display 306.

In addition, the sound box 300 may further include a power supply apparatus 307 (for example, a battery and a power management chip) that supplies power to the components. The battery may be logically connected to the processor 301 by using the power management chip, so that functions such as charging management, discharging management, and power consumption management are implemented by using the power supply apparatus 307.

In addition, the sound box 300 may further include a sensor module 308. The sensor module 308 may include a barometric pressure sensor, a temperature sensor, and the like. In actual application, the sound box 300 may alternatively include more or fewer sensors, or the foregoing enumerated sensors may be replaced with other sensors having same or similar functions, or the like. This is not limited in this application.

The barometric pressure sensor is configured to measure barometric pressure. In some embodiments, the processor 301 may be coupled to the barometric pressure sensor, and assist in calculation by using an atmospheric pressure value measured by the barometric pressure sensor, for example, in calculating an attenuation coefficient of a sound.

The temperature sensor is configured to detect a temperature. In some embodiments, the processor 301 may be coupled to the temperature sensor, and assist in calculation by using a temperature value measured by the temperature sensor, for example, in calculating the attenuation coefficient of the sound.

It may be understood that the device structure shown in FIG. 3 does not constitute a specific limitation on the sound box. In some other embodiments, the sound box may include more or fewer components than those shown in the figure, or some components may be combined, or some components may be split, or different component arrangements may be used. The components shown in the figure may be implemented by hardware, software, or a combination of software and hardware.

A software system of the sound box may use a layered architecture, an event-driven architecture, a microkernel architecture, a micro service architecture, or a cloud architecture. In this embodiment of the present disclosure, an Android system with a layered architecture is used as an example to describe a software structure of the sound box.

Figure 4:
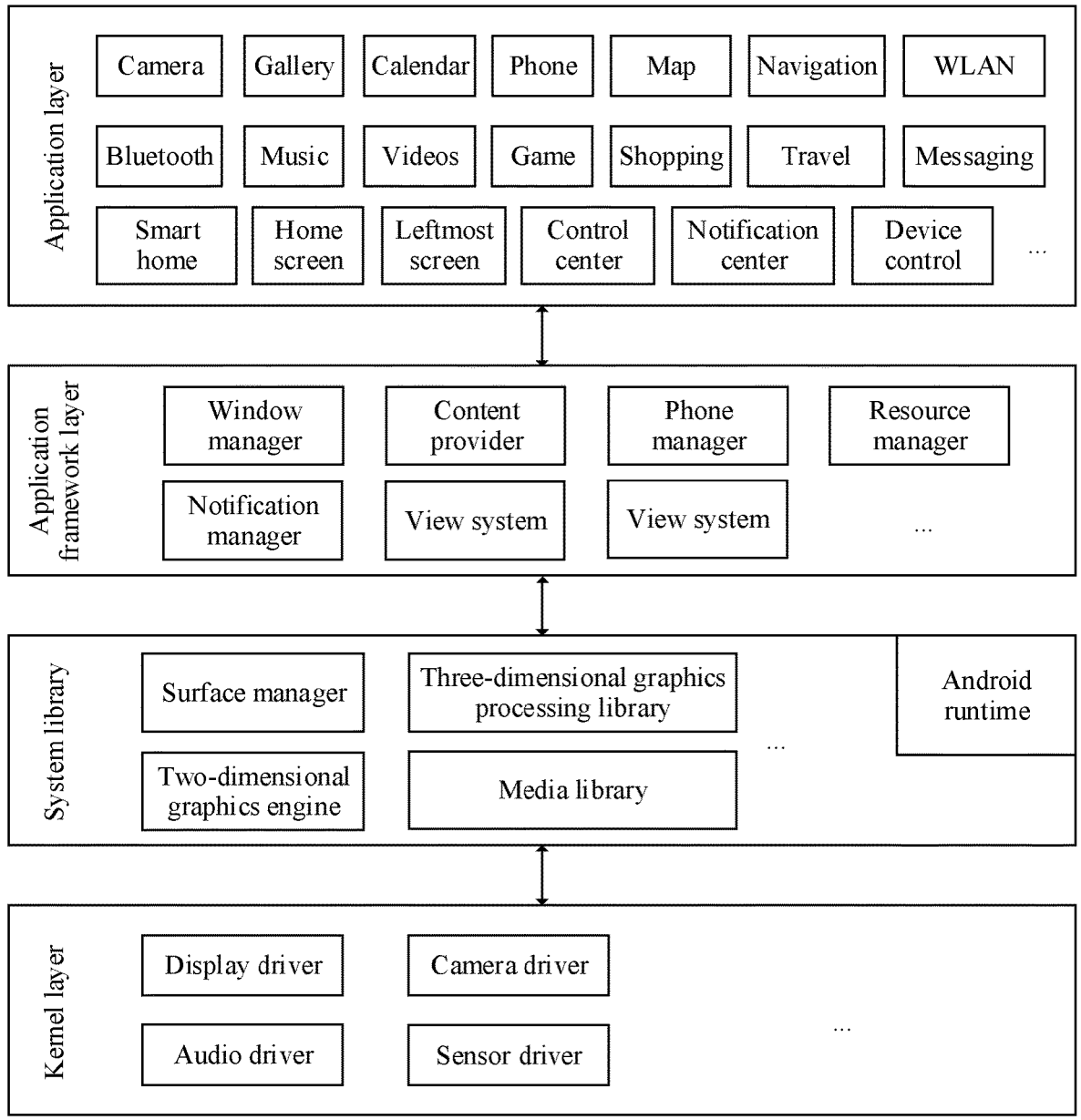
FIG. 4 is a block diagram of a software structure of a sound box according to an embodiment of this application.

FIG. 4 shows a block diagram of the software structure of the sound box according to an embodiment of this application.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 4, the application packages may include applications such as Camera, Gallery, Calendar, Phone, Map, Navigation, WLAN, Bluetooth, Music, Videos, Game, Shopping, Traveling, Instant Messaging (Messaging), Smart Home, and Device Control.

The Smart Home application may be used to control or manage a home device having a networking function. For example, the home device may include an electric light, a television, and an air conditioner. For another example, the home device may further include an anti-theft door lock, a sound box, a floor sweeping robot, a socket, a body fat scale, a desk lamp, an air purifier, a refrigerator, a washing machine, a water heater, a microwave oven, an electric cooker, a curtain, a fan, a television, a set-top box, a door, and a window. The Device Control application is used to control or manage a single device.

In addition, the application packages may further include system applications such as a home screen (namely, a desktop), a leftmost screen, a control center, a notification center, a card application, and a card service application.

The leftmost screen may also be referred to as a "−1 screen", and refers to a user interface (user interface, UI) obtained by sliding a screen rightward on a home screen of an electronic device until sliding to the leftmost split screen. For example, the leftmost screen may be used to place some quick service functions and notification messages, such as global search, a quick entry (a payment code, WeChat, and the like) of a page of an application, instant information, and reminders (express information, expenditure information, commuting road conditions, taxi hailing information, schedule information, and the like), and followed dynamic information (such as a football platform, a basketball platform, and stock information). The control center is a drop-down message notification bar of the electronic device, namely, a user interface displayed by the electronic device when a user performs a downward operation on the electronic device. The notification center is a pull-up message notification bar of the electronic device, namely, a user interface displayed by the electronic device when the user performs an upward operation on the electronic device. The card service application is used to provide a card service, so as to support UI display of a card, sharing of the card between applications on a same device, sharing of the card between devices, and the like.

The application framework layer provides an application programming interface (application programming interface, API) and a programming framework for an application at the application layer. The application framework layer includes some predefined functions.

As shown in FIG. 4, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, audio, calls that are made and answered, a browsing history and bookmarks, a phone book, and the like.

The view system includes visual controls such as a control for displaying text and a control for displaying an image. The view system may be configured to construct an application. A display interface may include one or more views. For example, a display interface including an SMS message notification icon may include a view for displaying text and a view for displaying an image.

The phone manager is configured to provide a communication function of the sound box, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The displayed notification information may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the sound box vibrates, or the indicator light blinks.

The Android runtime includes a core library and a virtual machine. The Android runtime is responsible for scheduling and management of the Android system.

The core library includes two parts: a function that needs to be invoked in Java language, and a core library of Android.

The application layer and the application framework layer run on the virtual machine. The virtual machine executes Java files of the application layer and the application framework layer as binary files. The virtual machine is configured to perform functions such as object lifecycle management, stack management, thread management, security and exception management, and garbage collection.

The system library may include a plurality of functional modules, for example, a surface manager (surface manager), a media library (Media Library), a three-dimensional graphics processing library (for example, an OpenGL ES), and a 2D graphics engine (for example, an SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working process of software and hardware of the sound box with reference to a photographing scenario.

When a touch sensor 180K receives a touch operation, a corresponding hardware interrupt is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. An example in which the touch operation is a touch operation, and a control corresponding to the touch operation is a control of a camera application icon is used. A camera application invokes an interface of the application framework layer to start the camera application, so that the camera driver is started by invoking the kernel layer, and a static image or a video is captured through a camera 193.

The following explains and describes some terms in this application, to facilitate understanding by a person skilled in the art.

1. An atomic ability (atomic ability, AA) is developed by a developer, is a program entity that implements a single function, and has no user interface (user interface, UI). In addition, there is a dependency relationship between the AA and a system service (system service), and there is no dependency relationship between AAs. The system service may include but is not limited to a clock service (RTC), a connection manager (Wi-Fi and a GSM modem), positioning (GPS), a power supply (PMIC), a sensor, and communication (a GSM modem, Wi-Fi, and Bluetooth).

2. A feature ability (feature ability, FA) is a program entity that implements a user feature function by invoking the AA and/or the FA.

3. A traffic FA (also referred to as a parent FA (Parent FA)) and a service FA (also referred to as a child FA (Child FA)) or a service AA (also referred to as a child AA (Child AA)) are all program entities.

The traffic FA may virtually integrate the service FA and/or the service AA, so that data communication may be implemented between the traffic FA and the service FA and/or the service AA. The traffic FA uses a dual-thread model, including a render thread (render thread) and a worker thread (worker thread). The render thread is mainly responsible for a rendering function of a UI, and the worker thread is mainly responsible for logic processing of a data service displayed or operated on the UI and data request communication.

4. Virtual integration (virtual integration, VI): When developing a traffic FA, a developer needs to register, in a virtual integration management module configuration file (configuration file for short) of the traffic FA, a service FA and/or a service AA on which the traffic FA needs to depend, for example, store an identifier (for example, a bundle name) of the service FA.

When the traffic FA needs to be run on a device, a first device, by using the configuration file, searches a bundle manager service of the device for a service FA and/or a service AA that is being run. If no service FA and/or service AA is being run in the bundle manager service, the first device may download the service FA and/or the service AA from an FA cloud server (for example, an FA application market) and start the service FA and/or the service AA. The FA cloud server mentioned in this application is the first server.

5. Both a card and a search box are manners in which the traffic FA and service FA display the UI. The card may display information and has a jump function. For example, when a user taps a song A on a player card, an interface for displaying lyrics of the song A may be jumped to. Alternatively, the card may display information and has a service function triggered by a tap event. For example, the user may tap a next track operation button on the player card to implement a song switching function. In addition, the card can be self-developed by a developer or downloaded from an FA application server.

6. An ability manager service (ability manager service, AMS) is mainly responsible for running management of an ability (namely, an FA and/or an AA), and may include ability instance stack management, ability lifecycle scheduling, window manager (Window Manager) management interaction, and the like.

7. A bundle manager service (bundle manager service, BMS) manages installation, uninstallation, optimization, query, and the like of various resource packages (such as a bundle).

8. A process is an independent memory workspace allocated by an operating system to each application.

With reference to FIG. 5A to FIG. 10C, the following uses an example to describe a specific implementation process in which a sound box implements song playing by using a sound box FA.

Figure 5A:
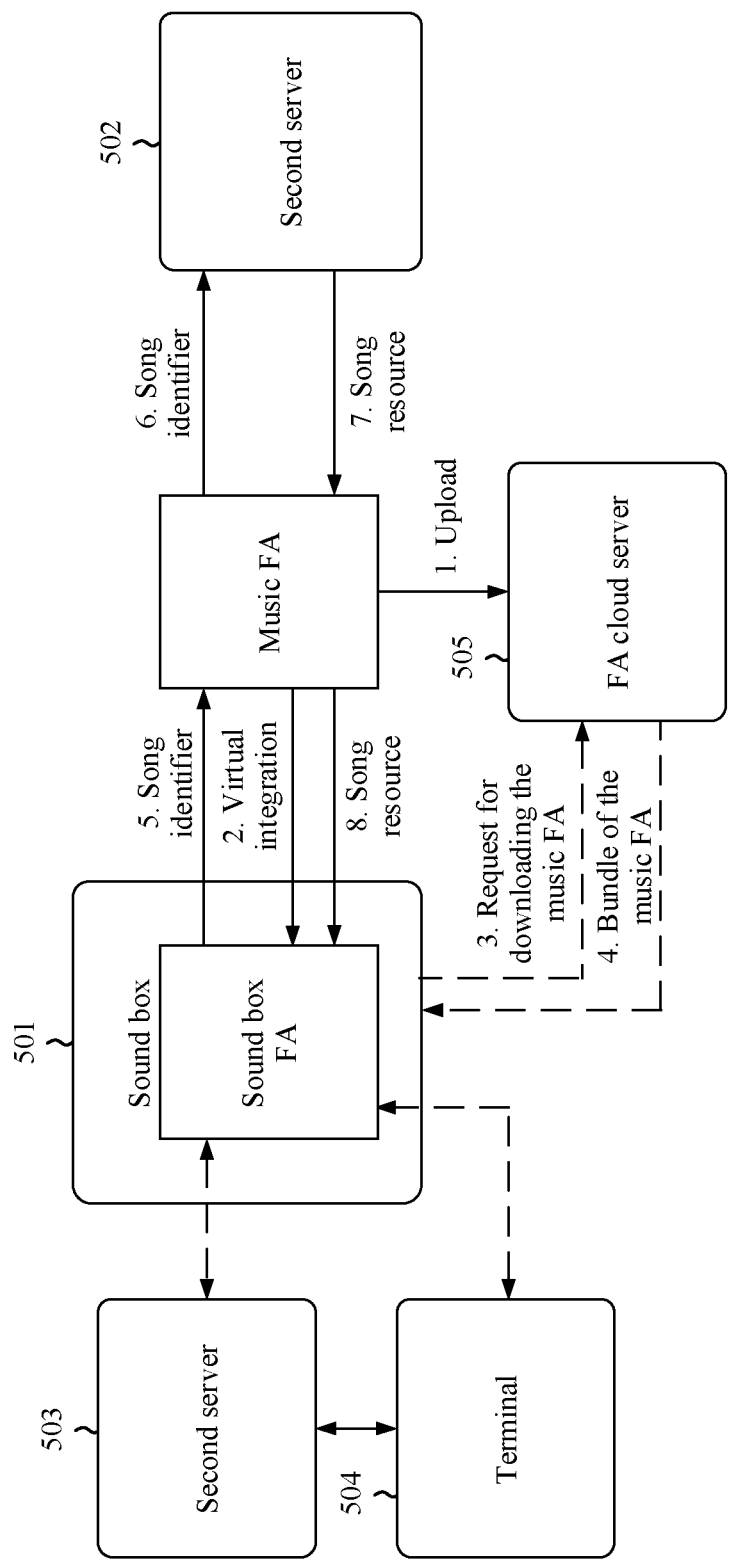
FIG. 5A and FIG. 5B each are a diagram of a system architecture of a device control method according to an embodiment of this application.
Figure 5B:
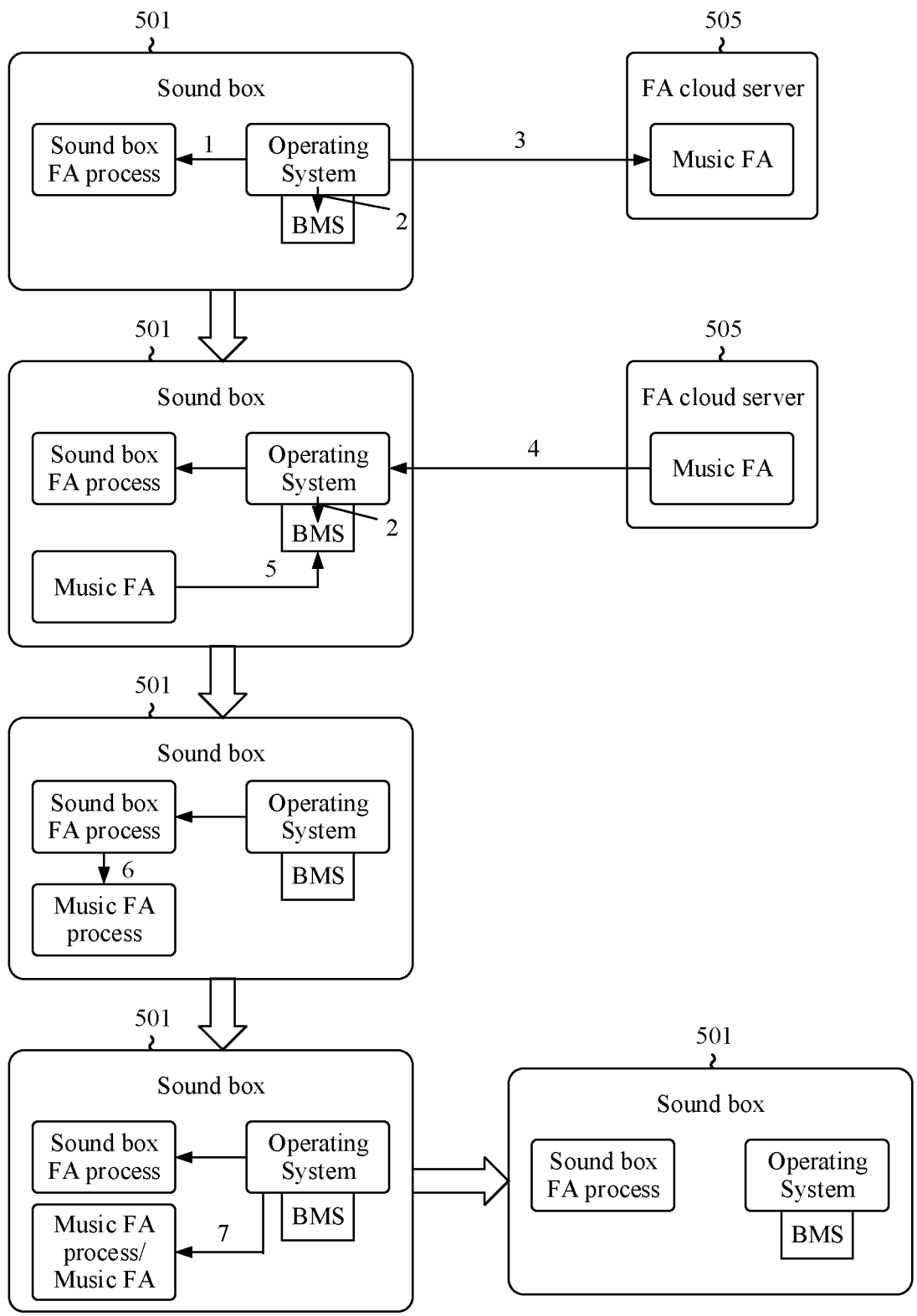
Figures 1, 5C:
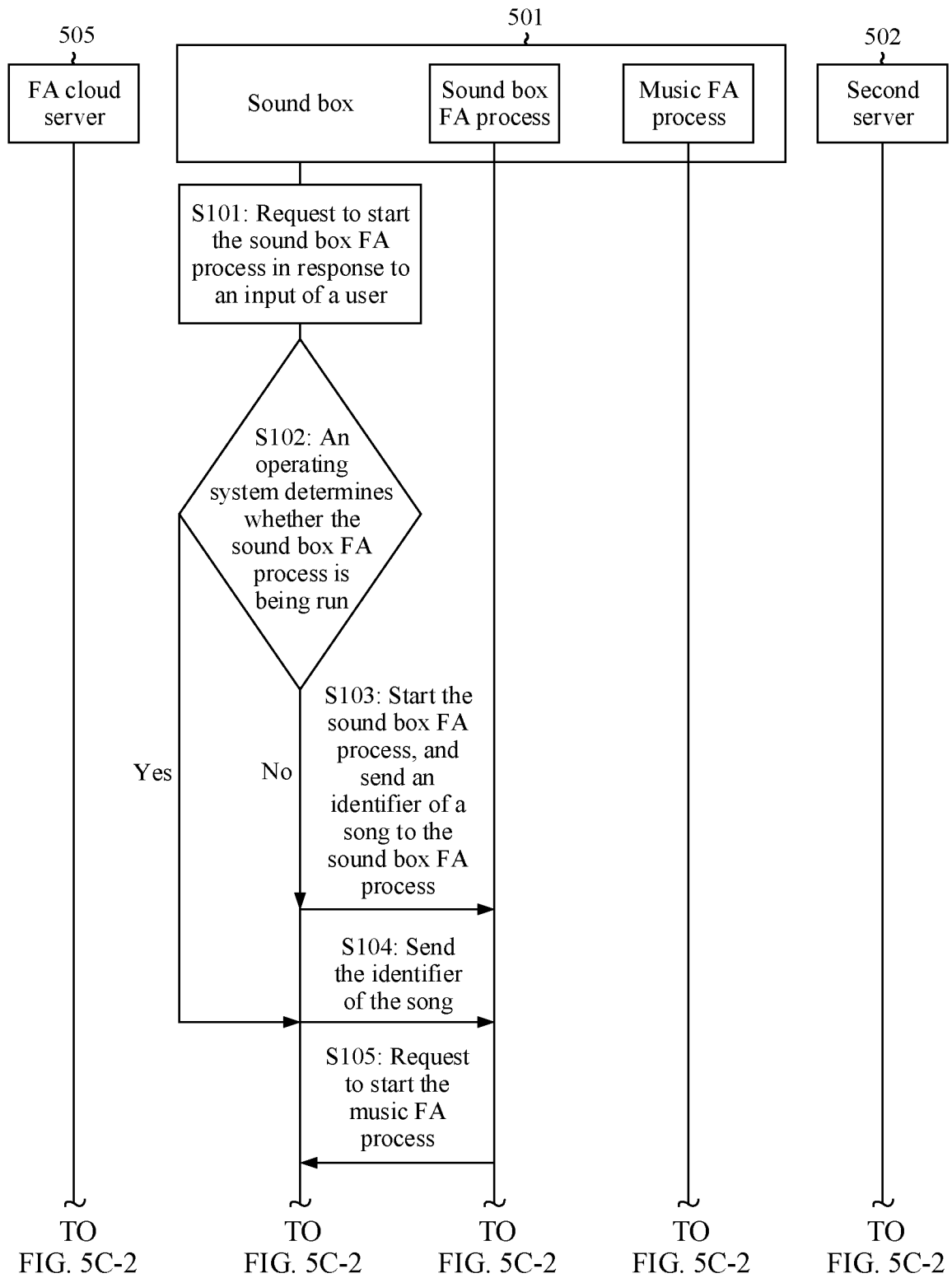
Figures 2, 5C:
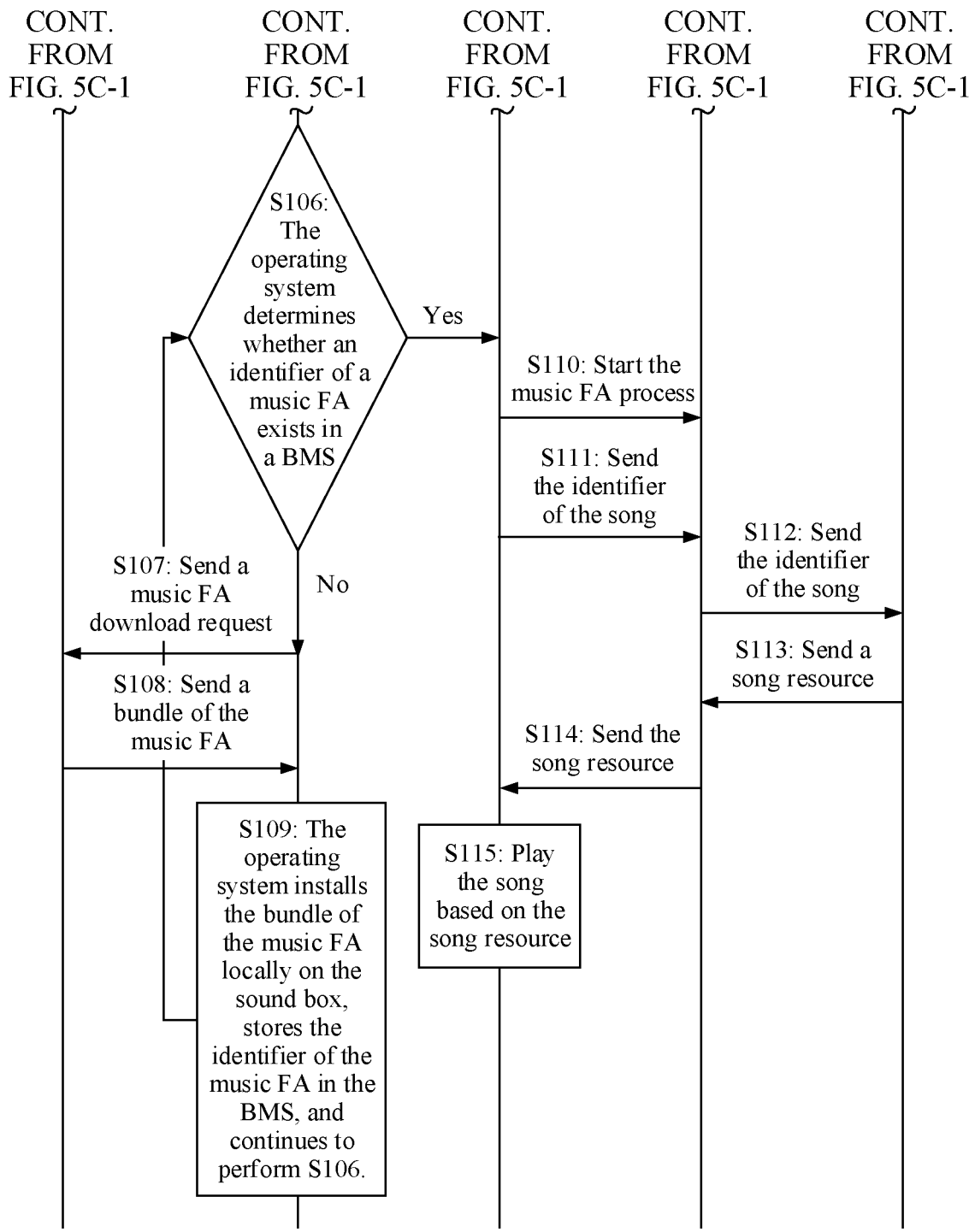

FIG. 5A and FIG. 5B each are a diagram of a system architecture of a device control method according to an embodiment of this application. FIG. 5C-1 and FIG. 5C-2 are a signaling flowchart of a device control method according to an embodiment of this application.

As shown in FIG. 5A and FIG. 5B, a music vendor develops a music FA (the music FA is a service FA and/or a service AA) based on a defined FA/AA development specification (or an interface specification), and uploads the music FA to an FA cloud server 505 (which corresponds to Step 1 in FIG. 5A).

A specific implementation of the FA/AA development specification is not limited in this application. In addition, information that is of the music FA and that is uploaded to the FA cloud server 505 in FIG. 5A may include but is not limited to description documents such as an identifier (such as a bundle name) of the music FA, an FA/AA version number, whether virtual integration can be performed, an authorization method for virtual integration, user permission required by an AA, an API and a functional interface, whether data synchronization association is supported and a data synchronization association interface, and whether charging is required. The data synchronization association herein means that data (such as page logic data, page display data, and image resource data) corresponding to the sound box FA changes with data corresponding to the music FA, and the data corresponding to the music FA changes with the data corresponding to the sound box FA, that is, the data corresponding to the sound box FA keeps synchronous with the data corresponding to the music FA.

It should be noted that the music FA in this application is a music FA application.

A sound box vendor negotiates with the music vendor to reach business cooperation. The sound box vendor virtually integrates the music FA into the sound box FA (the sound box FA is a traffic FA) based on the music FA uploaded to the FA cloud server 505.

It should be noted that the sound box FA in this application is a sound box FA application.

A specific implementation process of virtually integrating the music FA into the sound box FA may be understood as follows: A developer registers, in a configuration file of the sound box FA, the music FA on which the sound box FA needs to depend, for example, stores an identifier (for example, a bundle name) of the music FA. That is, the developer preconfigures a dependency relationship between the sound box FA and the music FA, instead of physically integrating the music FA into the sound box FA.

With reference to FIG. 6A and FIG. 6B-1 and FIG. 6B-2, the following describes specific implementation processes of physically integrating an SDK of the music vendor into a sound box application in a related technology and virtually integrating the music FA into the sound box FA in this application.

Figure 6A:
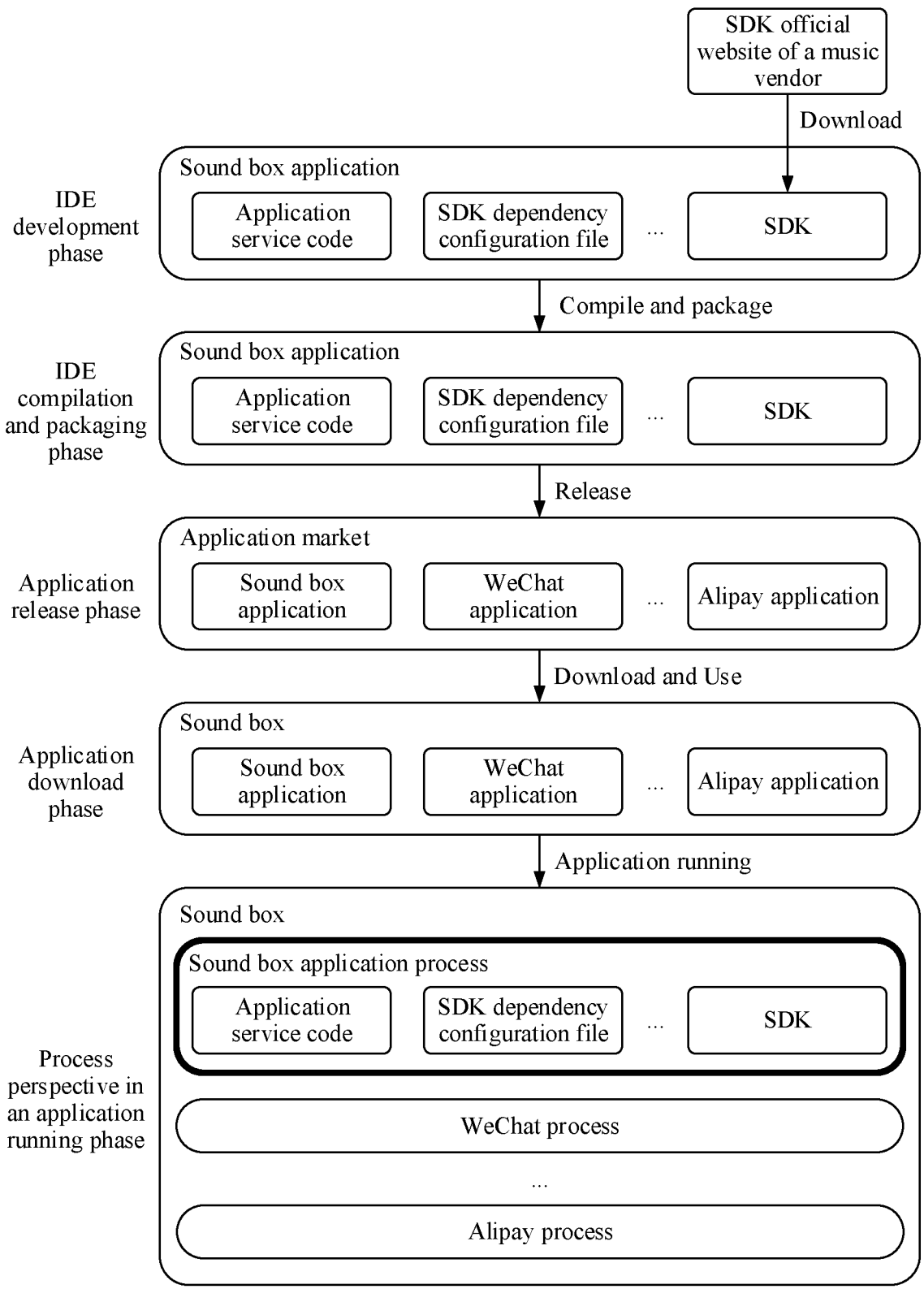
FIG. 6A is a schematic flowchart of physically integrating an SDK of a music vendor into a sound box application in a related technology.

As shown in FIG. 6A, in the related technology, a specific implementation process from creation to running of the sound box application may include Step 11 to Step 15.

Step 11: In an integrated development environment (integrated development environment, IDE) development phase, download the SDK of the music vendor from an SDK server of the music vendor (for example, an SDK official website of the music vendor), and compile an application service code and an SDK dependency configuration file of the sound box application.

Step 12: In an IDE compilation and packaging phase, compile and package the application service code, the SDK dependency configuration file, and the SDK of the music vendor to obtain the sound box application.

Step 13: In an application release phase, release the sound box application in an application cloud server (for example, an application market) of the sound box vendor. In addition, the application market of the sound box vendor may further include a chat application (a WeChat application is used as an example for illustration in FIG. 6A), a payment application (an Alipay application is used as an example for illustration in FIG. 6A), and the like.

Step 14: In an application download and use phase, a sound box downloads the sound box application from the application market of the sound box vendor. In addition, the sound box may further download the WeChat application, the Alipay application, and the like from the application market of the sound box vendor. It should be noted that downloading the sound box application from the application market of the sound box vendor does not depend on downloading the WeChat application, the Alipay application, and the like from the application market of the sound box vendor. Downloading the WeChat application, the Alipay application, and the like from the application market of the sound box vendor is used to indicate that the sound box may further download another application other than the sound box application.

Step 15: From a perspective of the process in the running phase of the sound box application, the application service code, the SDK dependency configuration file, and the SDK of the music vendor are all run in a sound box application process.

In conclusion, in the related technology, the sound box vendor needs to independently develop the sound box application of the sound box vendor, and needs to physically integrate the SDK of the music vendor, and install the sound box application in a sound box. As a result, a data packet of the sound box application is large, and a large amount of storage and running space is occupied. The SDK of the music vendor and the sound box application process belong to a same process. Therefore, the SDK of the music vendor occupies storage space regardless of whether the SDK of the music vendor is used. In addition, the SDK of music vendor has many functional interfaces, and an interconnection process is complex and time costs are high. In addition, the SDK of the music vendor cannot be run independently.

Figures 1, 6B:
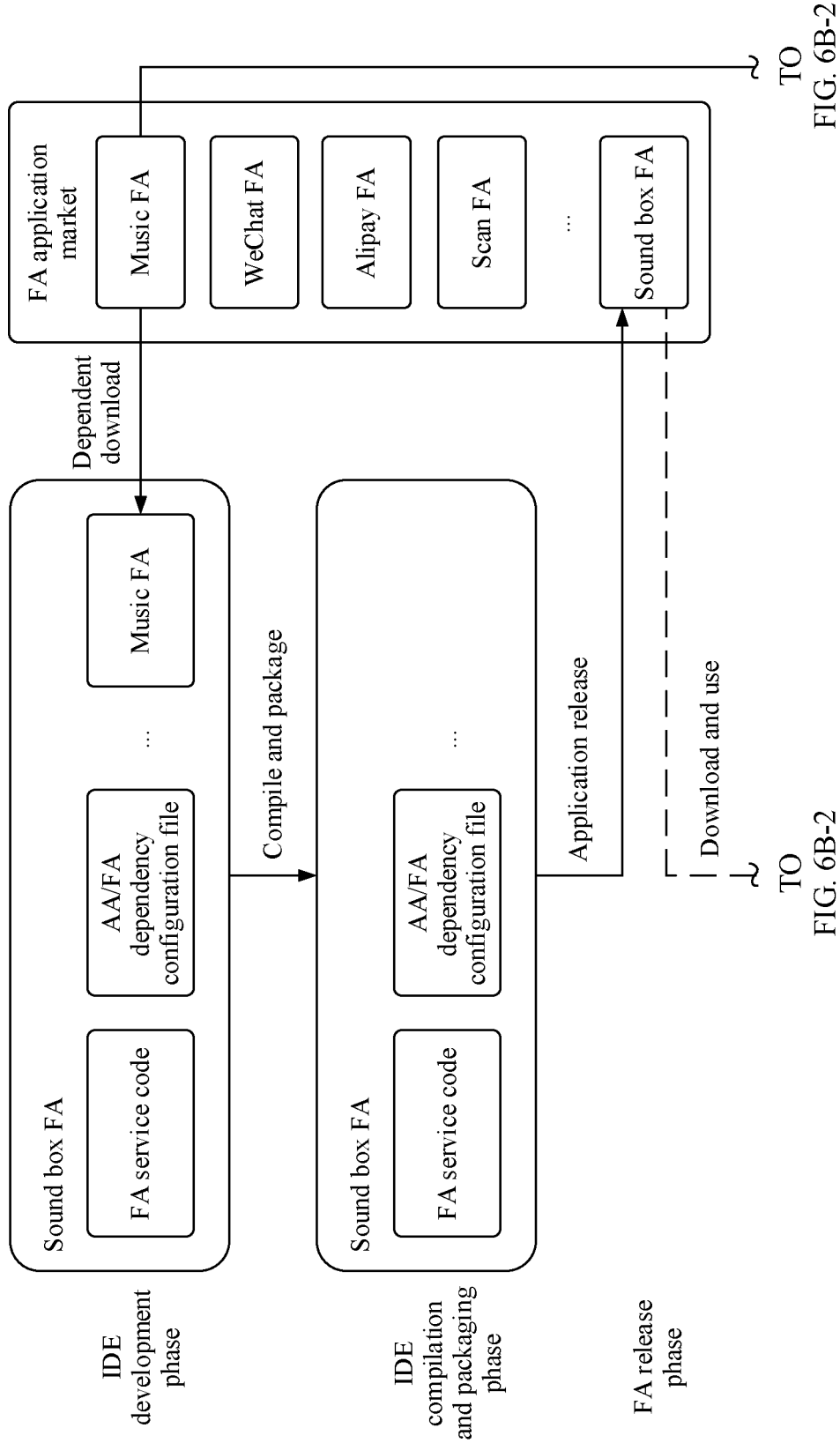
Figures 2, 6B:
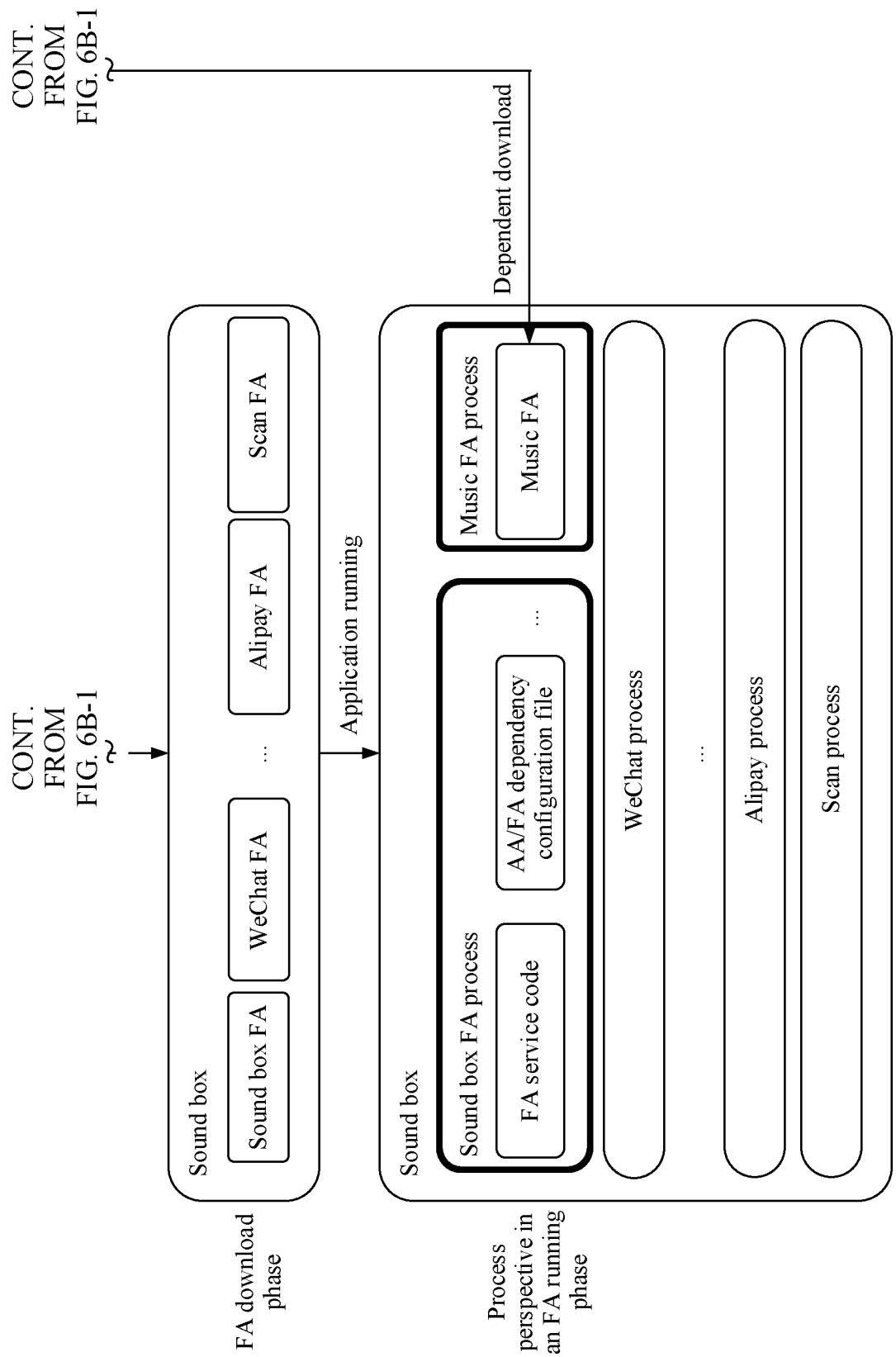

As shown in FIG. 6B-1 and FIG. 6B-2, in this application, a specific implementation process from creation to running of the sound box FA may include Step 21 to Step 25.

Step 21: In an IDE development phase, download the music FA from the FA cloud server 505 (for example, an FA application market), and compile an FA service code and an AA/FA dependency configuration file of the sound box FA, so that, by debugging each interface and function of the music FA, the developer of the sound box FA can preview an interface displayed by the sound box FA and learn and confirm a specific function implemented by the music FA in the music FA. An identifier of the music FA is registered in the AA/FA dependency configuration file.

Step 22: In an IDE compilation and packaging phase, compile and package the FA service code of the music FA and the AA/FA dependency configuration file to obtain the sound box FA.

Step 23: In an FA release phase, release the sound box FA in the FA application market. In addition, the FA application market may further include a chat FA (a WeChat FA is used as an example for illustration in FIG. 6B-1 and FIG. 6B-2), a payment FA (an Alipay FA is used as an example for illustration in FIG. 6B-1 and FIG. 6B-2), a scanning FA (a scan FA is used as an example for illustration in FIG. 6B-1 and FIG. 6B-2), and the like.

Step 24: In an FA download and use phase, a sound box downloads the sound box FA from the FA application market. In addition, the sound box may further download the WeChat FA, the Alipay FA, the scan FA, and the like from the FA application market. It should be noted that downloading the sound box FA from the FA application market does not depend on downloading the WeChat FA, the Alipay FA, the scan FA, and the like from the FA application market. Downloading the WeChat FA, the Alipay FA, the scan FA, and the like from the FA application market is used to indicate that the sound box can download another FA other than the sound box FA.

Step 25: From a perspective of a process in an FA running phase, the FA service code and the AA/FA dependency configuration file of the sound box FA are both run in a sound box FA process, the music FA is run in a music FA process, and the sound box FA process and the music FA process are two different processes. If the sound box does not include the music FA, the sound box FA dependently downloads the music FA from the FA application market based on the identifier of the music FA registered in the AA/FA dependency configuration file.

In conclusion, in this application, the sound box vendor stores the identifier of the music FA in the sound box FA based on the uploaded music FA, to implement virtual integration of the music FA into the sound box FA, and installs the sound box FA in the sound box, so that a data packet of the sound box FA is small and occupies small storage and running space. This reduces traffic consumption when a user downloads the sound box FA.

When the sound box FA requests a music resource of the music vendor, the sound box FA may obtain the music resource (for example, a resource of a song) from a server (namely, a second server 502) of the music vendor through the virtually integrated music FA, so that the sound box can play the song based on the music resource, data synchronization association between the sound box FA and the music FA is ensured, and development and interconnection costs of data synchronization association between the sound box FA and the music FA are much lower than development and interconnection costs of the SDK of the music vendor.

Because the sound box FA process and the music FA process are two different processes, the music FA occupies storage space when the sound box FA needs to invoke the music FA, and does not occupy the storage space when the sound box FA does not need to invoke the music FA. This reduces storage memory and memory running overheads when the sound box FA is run and improves storage space usage.

After the running of the music FA is completed, an operating system of the sound box may manage, control, and kill the music FA based on an influencing factor such as a memory resource (which corresponds to Step 7 in FIG. 5B). In other words, parameters such as a running status of the music FA can be monitored, to learn in time whether the music FA can be invoked. In addition, the music FA process and related resources for the music FA downloaded from the FA application market can be released when the music FA is not required, to reduce memory overheads of the sound box.

In addition, the music FA may be run independently, or may be virtually integrated into another FA other than the sound box FA, so that the sound box FA and the another FA can separately invoke the music FA. It should be noted that the sound box FA and the another FA generally cannot invoke the music FA at the same time, and a sequence in which the sound box FA invokes the music FA and the another FA invokes the music FA may be determined according to an invoking policy.

Based on the foregoing descriptions, the sound box vendor installs, on a sound box 501, the sound box FA virtually integrated with the music FA (which corresponds to Step 2 in FIG. 5A). In this way, the sound box 501 does not need to physically integrate the SDK of the music vendor, but virtually integrates the music FA through the sound box FA, and can implement a music playing function.

With reference to FIG. 5A and FIG. 5B, as shown in FIG. 5C-1 and FIG. 5C-2, a specific implementation process of the device control method in this application may include Step S101 to Step S115.

S101: The sound box 501 requests, in response to an input of a user (for example, invoking a startAbility( ) function), to start a sound box FA process. The input of the user is used to indicate that the user requests the sound box 501 to play a song Love Story. It should be noted that start and invocation mentioned in this application have a same meaning.

The sound box FA process corresponds to a sound box FA application, and is used to obtain a music resource from the second server 502 through a music FA, and implement song playing through the sound box 501 based on the music resource.

Generally, each song has a unique identifier, namely, an identity document (identity document, ID), in a representation form of, for example, a song name or a song number. Therefore, in some embodiments, the input of the user may carry an identifier of the song Love Story. The input of the user in this application may include a plurality of feasible implementations, so that the user requests, in a plurality of manners, the sound box 501 to play the song Love Story.

With reference to three scenarios, the following uses an example to describe a specific implementation process in which the user requests the sound box to play the song Love Story.

In some embodiments, a terminal 504 is loaded with a sound box FA that communicates with the sound box 501. The terminal 504 may send the input of the user to the sound box FA through a connection to the sound box FA, or may send the input of the user to the sound box FA through a connection to a third server 503 by using the third server 503. This is not limited in this application.

Therefore, the sound box FA application may determine a user requirement in response to the input of the user. The input of the user may be represented by using at least one operation such as tapping, sliding, or touching and holding, or may be represented by using an input such as a voice or an image. This is not limited in this application.

Figure 7:
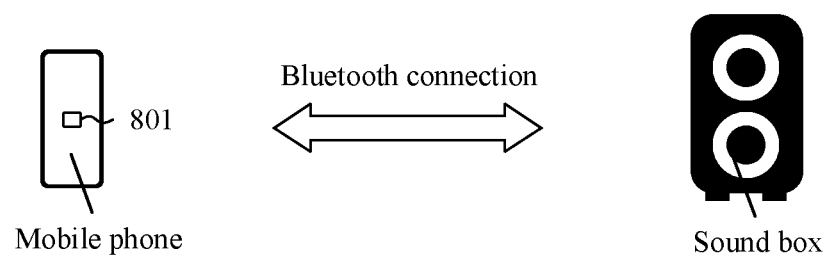
FIG. 7 is a schematic diagram of a scenario of a device control method according to an embodiment of this application.

FIG. 7 is a schematic diagram of a scenario of the device control method according to an embodiment of this application. FIG. 8A to FIG. 8D each are a schematic diagram of a human-machine interaction interface according to an embodiment of this application. In FIG. 7 to FIG. 8D, an example in which the terminal is a mobile phone and the terminal is connected to the sound box through Bluetooth is used for illustration.

As shown in FIG. 7, the user requests, by using a sound box FA in the mobile phone, the sound box to play the song Love Story. For example, the mobile phone sends the identifier of the song Love Story to the sound box. An icon of a sound box FA 801 may be located on a desktop of the mobile phone, or may be located in a notification center of the mobile phone. Parameters such as a specific location, a shape, and a size of the icon of the sound box FA 801 are not limited in this application.

An example in which the icon of the sound box FA 801 is located on the desktop of the mobile phone is used for illustration. A display of the mobile phone displays an interface shown in FIG. 8A. The icon of the sound box FA 801 is displayed on the interface. The user taps the icon of the sound box FA 801 on the interface shown in FIG. 8A.

In response to the tap operation, a desktop application invokes the startAbility( ) function to start the sound box FA process. A specific process may include Step 31 to Step 37.

Step 31: A launcher process initiates a startAbility request to a system_server process through IPC communication.

Step 32: After receiving the request, the system_server process sends a process creation request to a zygote process.

Step 33: The zygote process forks a new child process, namely, the sound box FA process.

Step 34: The sound box FA process initiates an attachApplication request to the system_server process.

Step 35: After receiving the request, the system_server process performs a series of preparations, and then sends a startAbility request to the sound box FA process through IPC communication.

Step 36: After receiving the request, the sound box FA process sends a start message to a main thread in the sound box FA process.

Step 37: After receiving the start message, the main thread in the sound box FA process creates a target ability and calls back a life cycle method of the ability.

At this point, the sound box FA process is started, that is, the sound box FA 801 is run. In this case, in some embodiments, the display of the mobile phone changes from the interface shown in FIG. 8A to an interface of the sound box FA shown in FIG. 8B, and the interface of the sound box FA is used to present the sound box FA.

The interface of the sound box FA may use an interface of the music FA, or may use an interface self-developed by a developer of the sound box FA, or may use the foregoing two implementations. This is not limited in this application. For example, in FIG. 8B, a name "AI Huawei sound box" of the sound box FA, a search box 802, a card A 803, and a card B 804 are displayed on the interface of the sound box FA.

The search box 802 is used to display a corresponding search result by receiving text, an image, a voice, or the like input by the user and through the self-developed interface. For example, in FIG. 8B, a search icon, text "Search", and an object used to provide a search resource, for example, represented by text "QQ Music and NetEase Cloud Music", are displayed in the search box 802.

The card A 803 is used to display a ranking list of songs to the user through a ranking list interface of the QQ Music. For example, the card A 803 includes a QQ Music icon, text "Ranking list", names of three songs, names of the three songs, and a singer name of each song (which is not limited herein to a song name and a singer name shown in FIG. 8B).

The card B 804 is used to present a playing status to the user through a recent song interface of the NetEase Cloud Music. For example, the card B 804 includes an icon of the NetEase Cloud Music, text "Recent songs", a song name Dangerously, a singer name Charlie Puth of the song Dangerously, an operation button of a previous track icon, an operation button of a play/pause icon, an operation button of a next track icon, an operation button of adding to favorites, and the like.

Figure 8A:
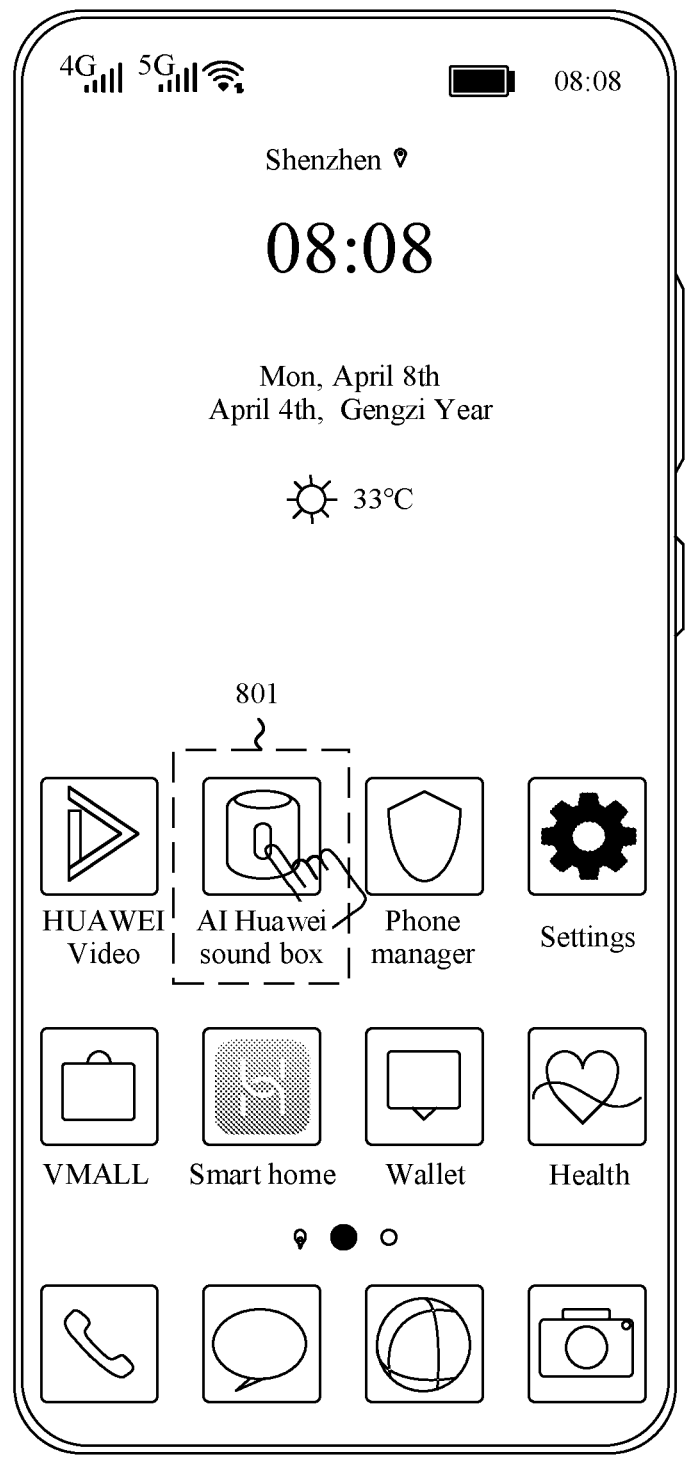
FIG. 8A to FIG. 8D each are a schematic diagram of a human-machine interaction interface according to an embodiment of this application.
Figure 8B:
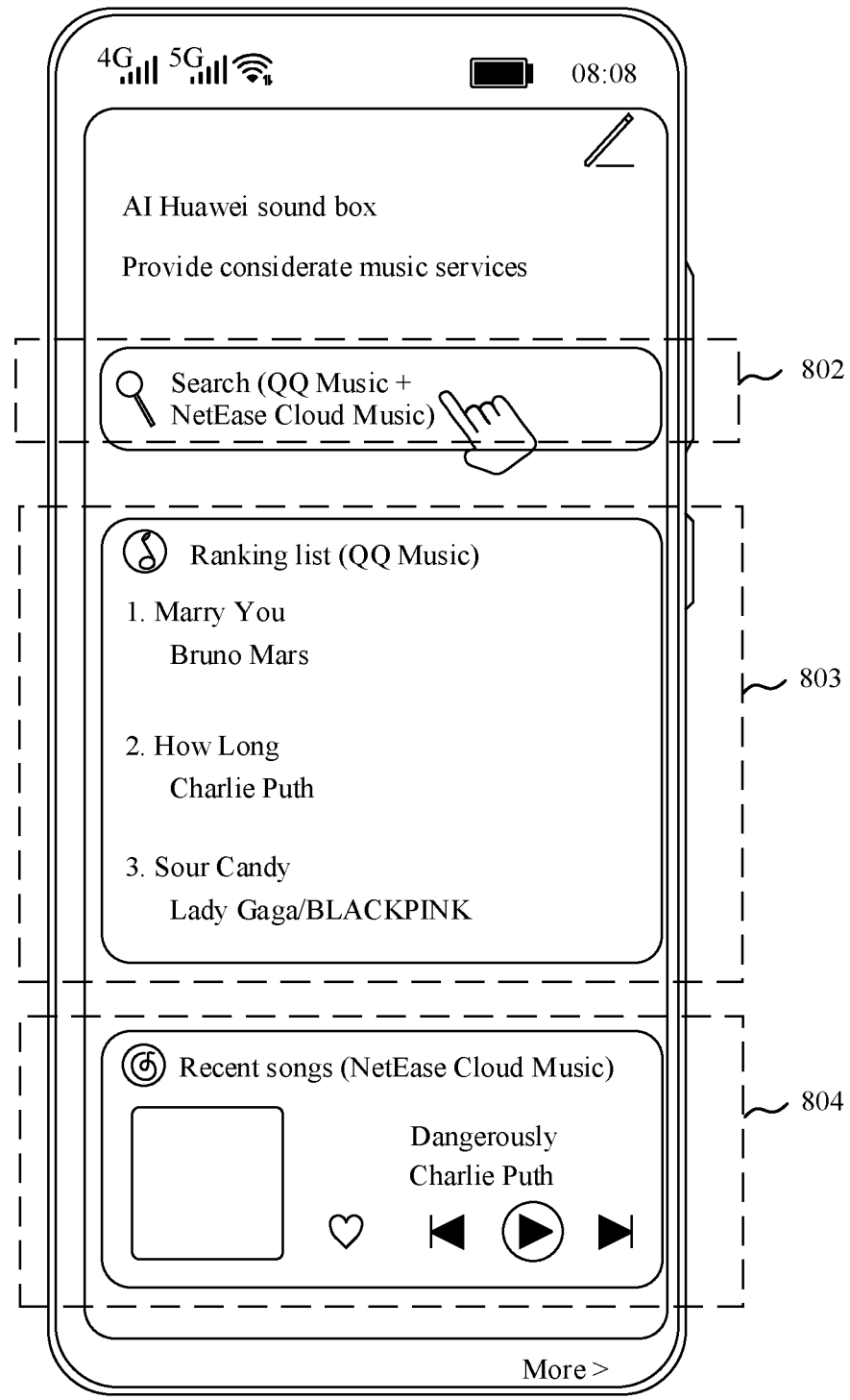

The user taps the search box 802 of the sound box FA on the interface shown in FIG. 8B, and enters Love Story in the search box 802. The display of the mobile phone displays an interface shown in FIG. 8C. The interface includes a drop-down menu of the search box 802, and is used to provide the user with a search result of Love Story (such as a source and quality of Love Story). For example, the search results such as QQ Music Love Story standard quality, QQ Music Love Story HQ high quality, NetEase Cloud Music Love Story standard quality, and NetEase Cloud Music Love Story high quality are displayed on the interface shown in FIG. 8C.

Figure 8C:
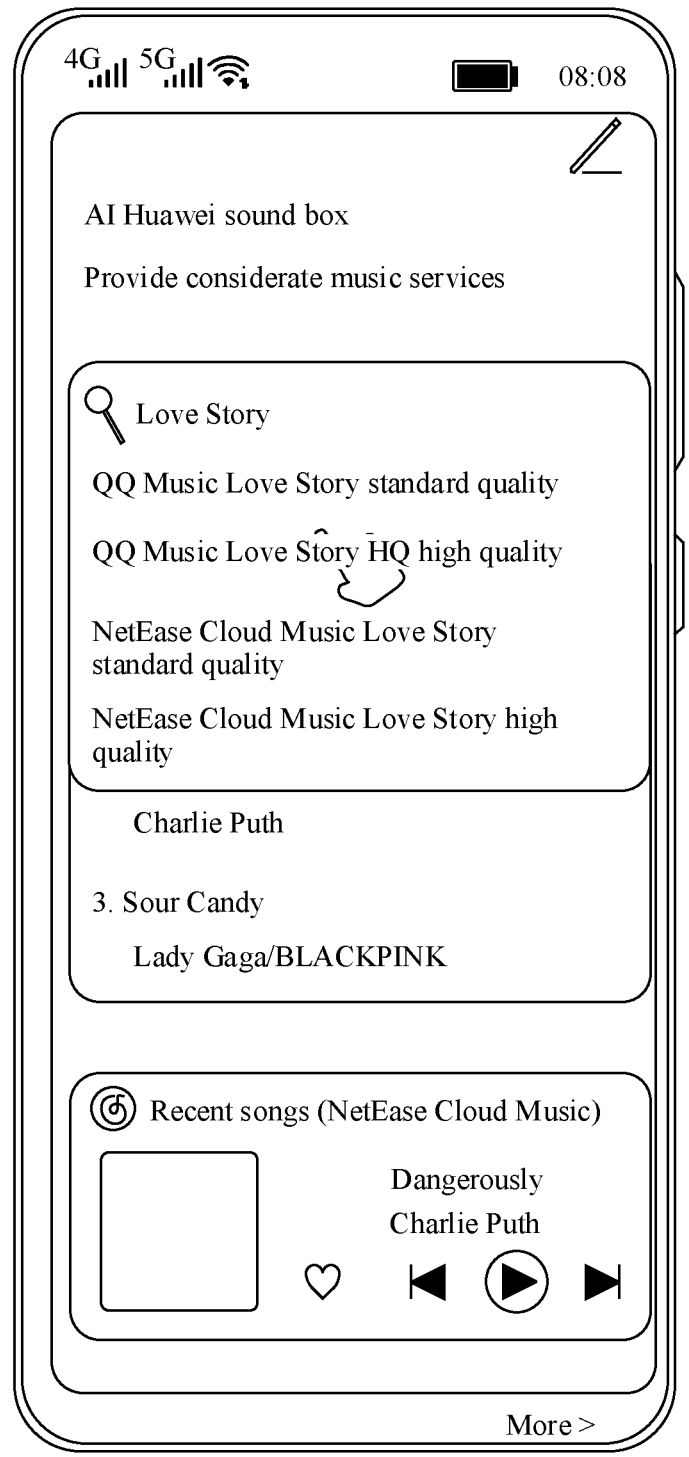
Figure 8D:
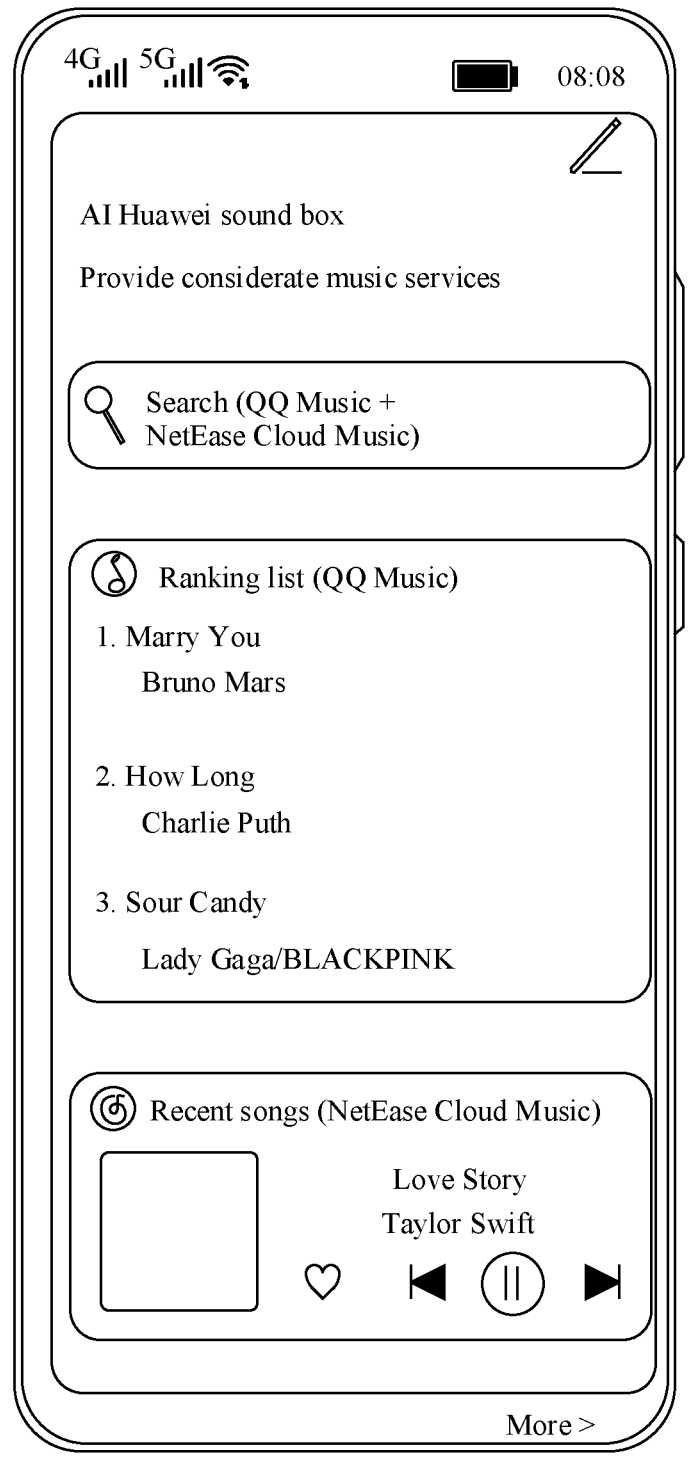

The user may tap the search result of QQ Music Love Story HQ high quality on the interface shown in FIG. 8C, so that the mobile phone sends, to the sound box, a request for playing the HQ high-quality song "Love Story" from the QQ Music. Therefore, the sound box can learn a requirement of the user for requesting the sound box to play the song Love Story, as shown in FIG. 8D.

In some other embodiments, the sound box 501 includes a display 5011. A sound box FA is loaded on the sound box 501, and the sound box FA may determine a user requirement in response to the input of the user. The input of the user may be represented by using at least one operation such as tapping, sliding, or touching and holding, or may be represented by using an input such as a voice or an image. This is not limited in this application.

Figure 9:
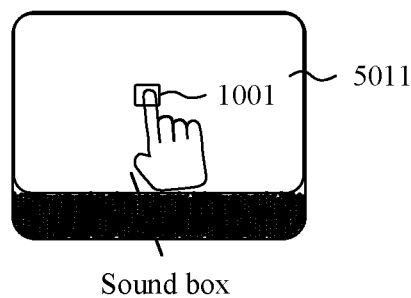
FIG. 9 is a schematic diagram of a scenario of a device control method according to an embodiment of this application.

FIG. 9 is a schematic diagram of a scenario of the device control method according to an embodiment of this application. FIG. 10A to FIG. 10D each are a schematic diagram of a human-machine interaction interface according to an embodiment of this application.

As shown in FIG. 9, the user requests, through a sound box FA application in a sound box, the sound box to play a song Love Story. For example, the sound box receives an identifier of the song Love Story. An example in which an icon of a sound box FA 1001 is located above a desktop of the sound box is used for illustration. A display of the sound box displays an interface shown in FIG. 10A. The icon of the sound box FA 1001 is displayed on the interface. The user taps the icon of the sound box FA 1001 on the interface shown in FIG. 10A.

Figure 10A:
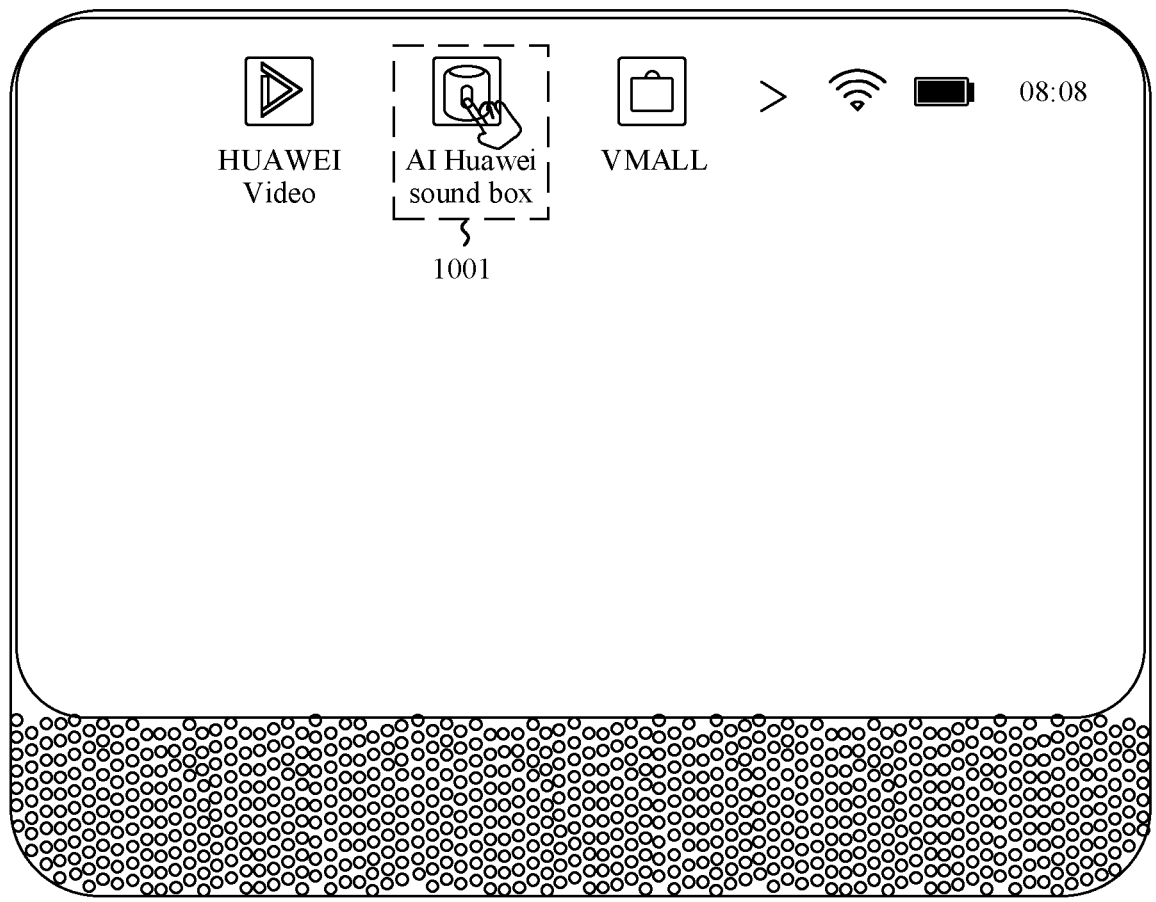
FIG. 10A to FIG. 10D each are a schematic diagram of a human-machine interaction interface according to an embodiment of this application.
Figure 10B:
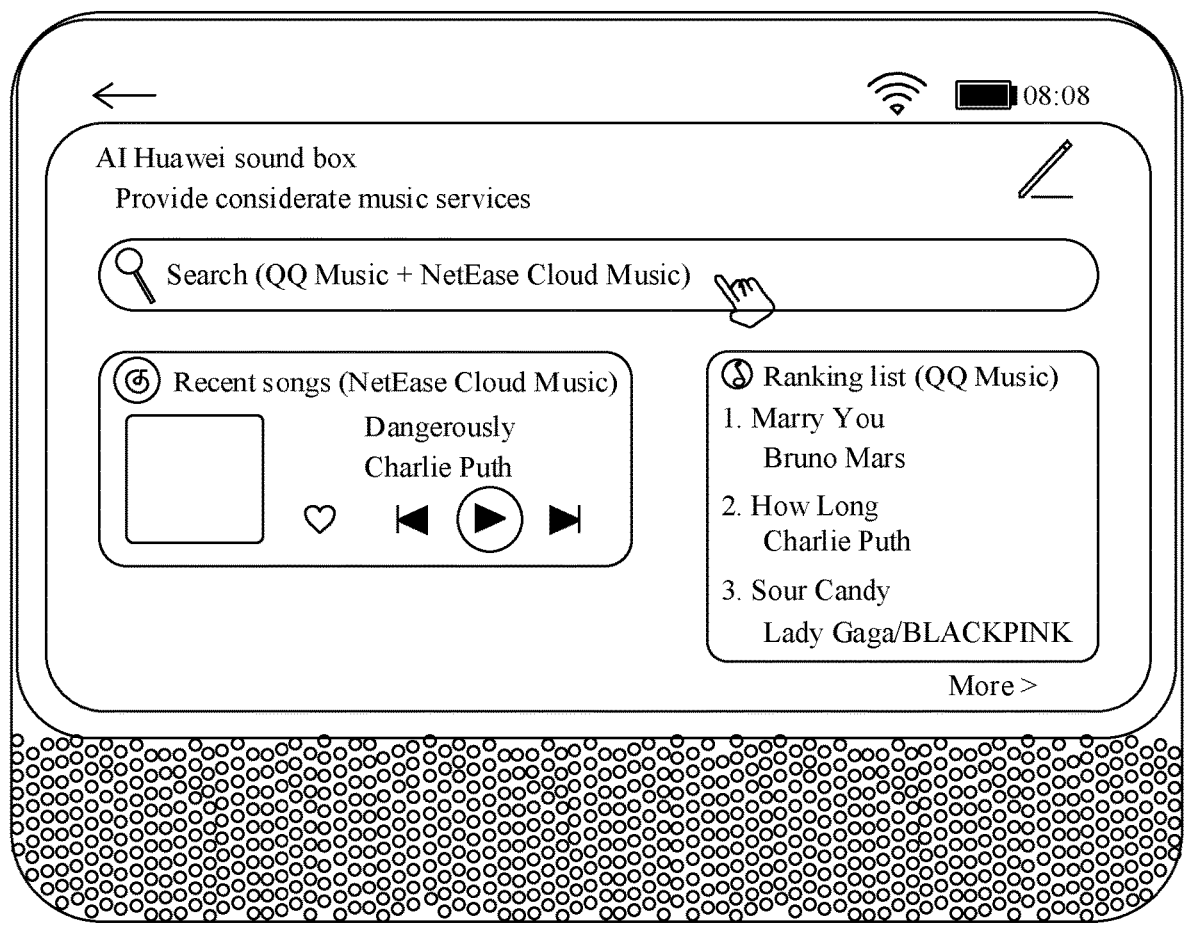

The display of the sound box changes from the interface shown in FIG. 10A to an interface of the sound box FA shown in FIG. 10B. The interface of the sound box FA on the display of the sound box may be the same as or different from the interface of the sound box FA on the display of the mobile phone. This is not limited in this application. For ease of description, the interface of the sound box FA shown in FIG. 10B and the interface of the sound box FA shown in FIG. 8B have same content but different interface layouts.

The user taps a search box of the sound box FA on the interface shown in FIG. 10B, and enters Love Story in the search box. The display of the sound box displays an interface shown in FIG. 10C. The interface includes a drop-down menu of the search box, and is used to provide the user with a search result of Love Story (such as a source and quality of Love Story). For example, the search results such as QQ Music Love Story standard quality, QQ Music Love Story HQ high quality, NetEase Cloud Music Love Story standard quality, and NetEase Cloud Music Love Story high quality are displayed on the interface shown in FIG. 10C.

Figure 10C:
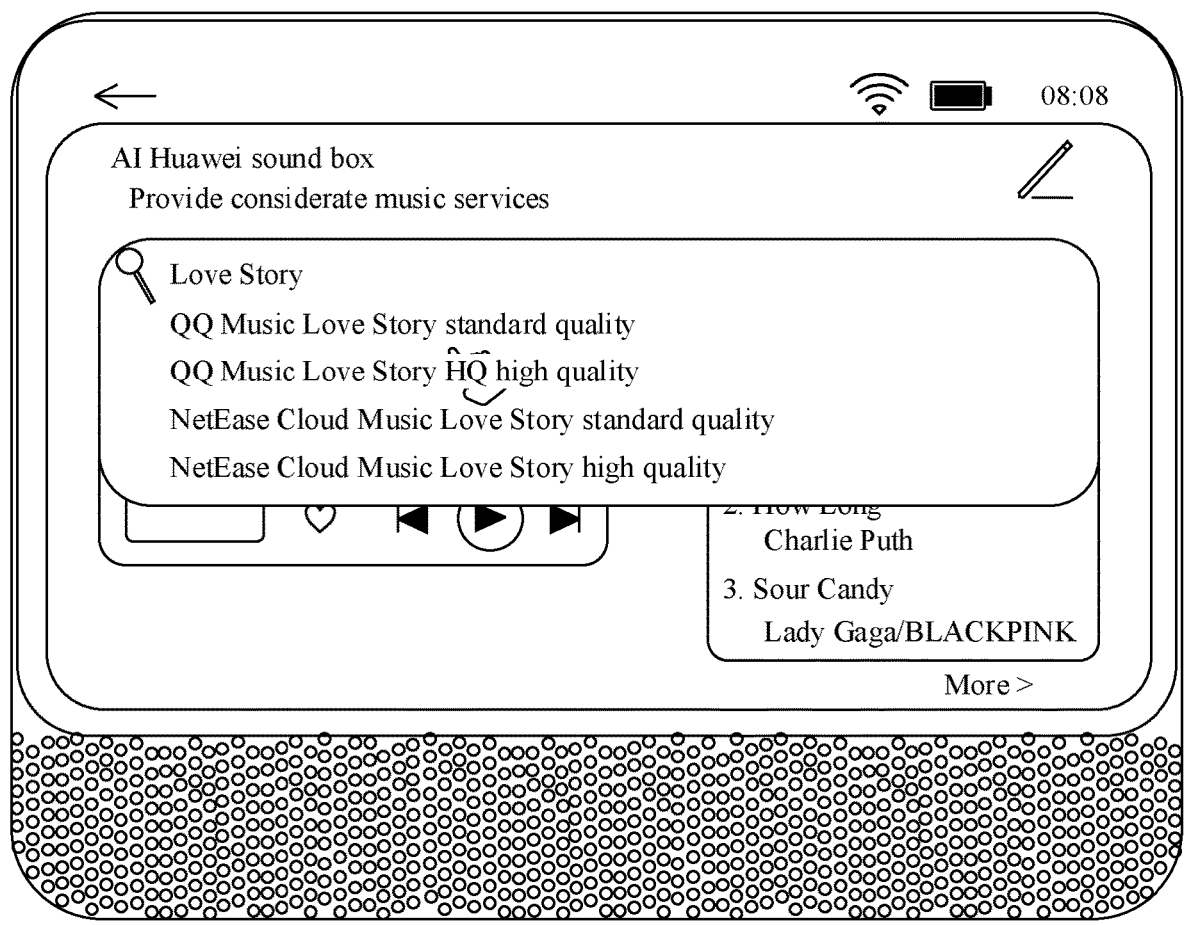

The user may tap the search result of QQ Music Love Story HQ high quality on the interface shown in FIG. 10C, so that the sound box learns a request that the user needs the sound box to play the HQ high-quality song "Love Story" from the QQ Music. Therefore, the sound box can learn a requirement of the user for requesting the sound box to play the song Love Story.

In some other embodiments, the sound box 501 has a voice recognition function, and may recognize a voice input of the user, to determine a user requirement. A specific implementation of the voice input is not limited in this application. For example, the voice input includes a keyword for waking up the sound box 501 and specific content for requesting the sound box 501 to perform an operation.

A specific implementation of implementing voice recognition by the sound box 501 is not limited in this application.

For example, the sound box 501 may integrate a conversion module for voice recognition into the sound box 501, and the sound box 501 performs the voice recognition on the voice input of the user by using the conversion module for voice recognition.

For another example, the sound box FA on the sound box 501 is connected to the third server 503. The sound box FA may send the voice input of the user to the third server 503. The third server 503 recognizes the voice input by using a voice recognition technology, to obtain a voice recognition result. Then, the third server 503 transmits the voice recognition result to the sound box FA.

Figure 11:
FIG. 11 is a schematic diagram of a scenario of a device control method according to an embodiment of this application.

FIG. 11 is a schematic diagram of a scenario of the device control method according to an embodiment of this application. As shown in FIG. 11, the user says "Xiaoyi, Xiaoyi" to the sound box, so that the sound box is woken up. "Xiaoyi, Xiaoyi" is a keyword for waking up the sound box. Generally, the sound box before being woken up may be in a low power consumption state. After the sound box is woken up, the sound box says "I'm here", so that the user confirms that the sound box is woken up. The user then says "Play the song Love Story" to the sound box. The "Play the song Love Story" is specific content for requesting the sound box to perform an operation, namely, an identifier of indicating the sound box to perform a playing operation and indicating the sound box to play the song Love Story. In this way, the sound box may learn, by using a voice recognition technology and based on the voice input of the user, a requirement of the user for requesting the sound box to play the song Love Story, for example, the sound box identifies an identifier of the song Love Story.

Figure 12:
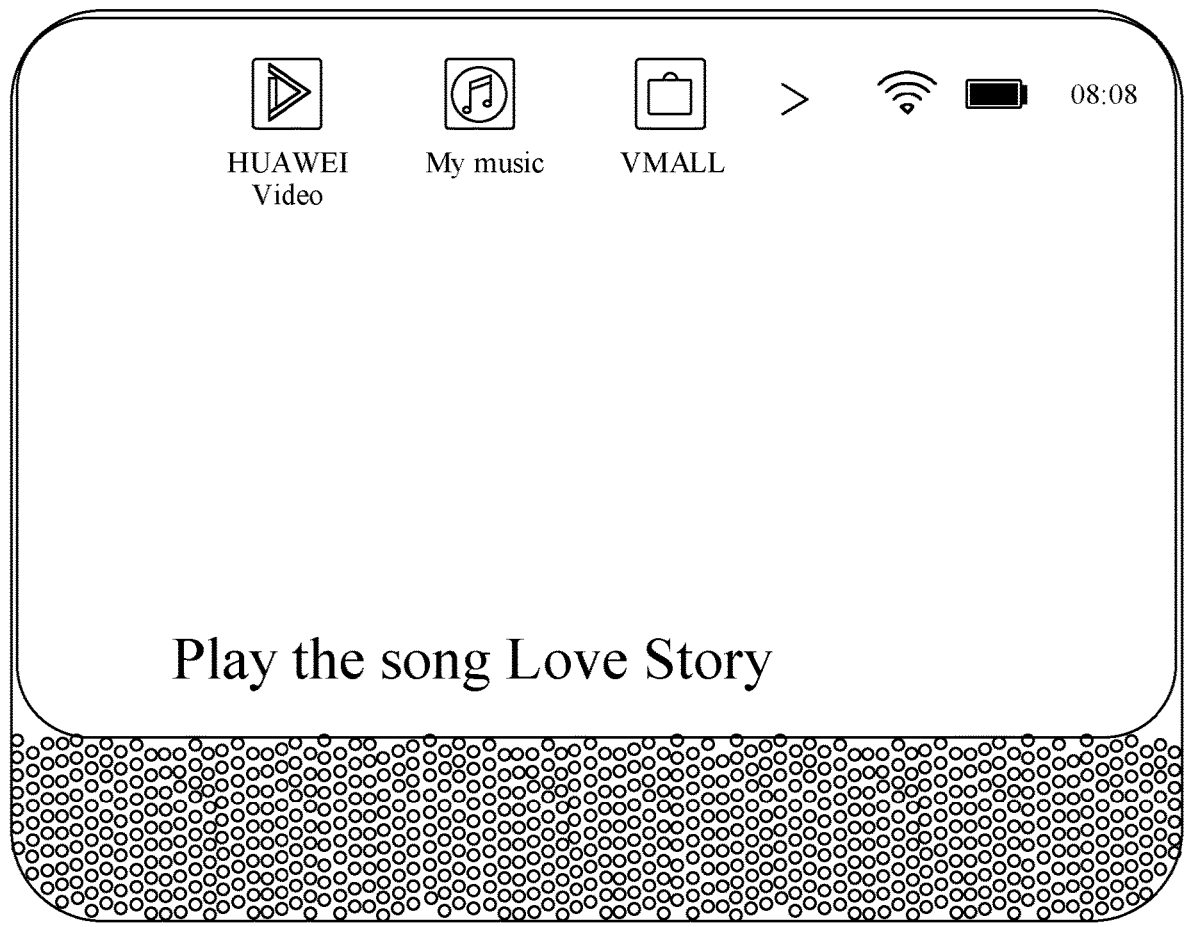
FIG. 12 is a schematic diagram of a human-machine interaction interface according to an embodiment of this application.

In addition, when the sound box includes a display, the display of the sound box displays an interface shown in FIG. 12. For example, text "Play the song Love Story" is displayed on the interface, so that the sound box prompts the user with a voice recognition result of the sound box through the interface. In this way, the user confirms whether the voice recognition result is accurate. This enables the user to execute a modification in time.

It should be noted that the sound box 501 may obtain the input of the user in a manner that is not limited to the foregoing several manners. In addition, for a specific process of enabling the sound box FA process by an application on the sound box 501 and another application on the mobile phone, refer to the description content of starting the sound box FA process by the desktop application of the mobile phone. Details are not described herein again.

S102: An operating system of the sound box 501 determines whether the sound box FA process is being run.

A person skilled in the art may understand that, when any process is being run, an operating system of a device registers an identifier of the process in a process list. Therefore, the operating system of the sound box 501 may query whether an identifier of the sound box FA process exists in the process list, to determine whether the sound box FA process is being run.

If the sound box FA process is not being run, step S103 is performed. If the sound box FA process is being run, step S104 is performed.

S103: The sound box 501 invokes, for example, the startAbility( ) function to start the sound box FA process, and sends the identifier of the song to the sound box FA process.

In some embodiments, a specific implementation process in which the sound box 501 starts the sound box FA process may include Step 41 to Step 47.

Step 41: An operating system process of the sound box 501 initiates a startAbility request to the system_server process through IPC communication.

Step 42: After receiving the request, the system_server process sends a process creation request to the zygote process.

Step 43: The zygote process forks the new child process, namely, the sound box FA process.

Step 44: The sound box FA process initiates the attachApplication request to the system_server process.

Step 45: After receiving the request, the system_server process performs a series of preparations, and then sends a startAbility request to the sound box FA process through IPC communication.

Step 46: After receiving the request, the sound box FA process sends a start message to the main thread in the sound box FA process.

Step 47: After receiving the start message, the main thread in the sound box FA process creates a target ability and calls back a life cycle method of the ability.

At this point, the sound box FA process is started.

S104: The sound box 501 sends the identifier of the song to the sound box FA process.

S105: The sound box FA process invokes, for example, the startAbility( ) function to request to start the music FA process.

It should be noted that, the operating system of the sound box 501 detects a running status of each process in real time. Therefore, the operating system of the sound box 501 may detect that the sound box FA process requests to start the music FA process (which corresponds to Step 1 in FIG. 5B), and further, the operating system of the sound box 501 may perform Step S106 of querying an identifier of the music FA in a BMS.

S106: The operating system of the sound box 501 determines whether the identifier of the music FA exists in the BMS (which corresponds to Step 2 in FIG. 5B), so that the sound box 501 can query whether a bundle of the music FA exists locally in the sound box (for example, a ROM and a RAM of the sound box 501). When a service FA or a service AA is installed on the sound box 501, the service FA or the service AA is registered in the BMS. For example, an identifier of the service FA or an identifier of the service AA is stored. Therefore, the operating system may determine, based on whether the music FA exists in the BMS, whether the music FA is installed on the sound box 501.

If the identifier of the music FA does not exist in the BMS, Step S107 to Step S109 are performed. If the identifier of the music FA exists in the BMS, Step S110 to Step S115 are performed.

S107: The operating system of the sound box 501 sends a music FA download request to the FA cloud server 505 (which corresponds to Step 3 in FIG. 5A and Step 3 in FIG. 5B). The music FA download request is used to indicate the FA cloud server 505 to send the bundle of the music FA to the sound box 501. In some embodiments, the music FA download request includes the identifier of the music FA.

S108: The FA cloud server 505 sends, based on the music FA download request, the bundle of the music FA to the operating system of the sound box 501 (which corresponds to Step 4 in FIG. 5A and Step 4 in FIG. 5B).

S109: The operating system of the sound box 501 unpacks the bundle of the music FA, installs the music FA locally on the sound box, registers the music FA (for example, stores the identifier of the music FA) in the BMS (which corresponds to Step 5 in FIG. 5B), and continues to perform S106, until the identifier of the music FA exists in the BMS (that is, the bundle of the music FA exists locally on the sound box). Because the music FA may fail to be installed in the operating system of the sound box 501, the music FA is not registered in the BMS. Therefore, the operating system of the sound box 501 needs to continue to perform S106 to determine whether the music FA is installed on the sound box 501.

S110: The sound box FA process invokes, for example, the startAbility( ) function to start the music FA process (which corresponds to Step 6 in FIG. 5B). Because the bundle of the music FA process exists locally on the sound box 501, the sound box FA process can successfully start the music FA process. In addition, the operating system of the sound box 501 may also notify the sound box FA process that the bundle of the music FA exists locally on the sound box 501, so that the sound box FA process starts the music FA process.

In some embodiments, a specific implementation process in which the sound box FA process starts the music FA process may include Step 51 to Step 57.

Step 51: The sound box FA process initiates a startAbility request to the system_server process through IPC communication.

Step 52: After receiving the startAbility request, the system_server process sends a process creation request to the zygote process.

Step 53: The zygote process derives (forks) a new child process, namely, the music FA process.

Step 54: The music FA process initiates an attachApplication request to the system_server process.

Step 55: After receiving the attachApplication request, the system_server process performs a series of preparations, and then sends a startAbility request to the music FA process through IPC communication.

Step 56: After receiving the request, the music FA process sends a start message to a main thread in the music FA process.

Step 57: After receiving the start message, the main thread in the music FA process creates a target ability and calls back a life cycle method of the ability.

At this point, the music FA process is started.

S111: After the music FA process is started, the sound box FA process sends a first music resource request to the music FA process (which corresponds to Step 5 in FIG. 5A). The first music resource request is used to request a music resource of the song Love Story from the music FA. In some embodiments, the first music resource request includes the identifier of the song Love Story.

S112: The music FA process sends a second music resource request to the second server 502 (namely, a server corresponding to the music FA) (which corresponds to Step 6 in FIG. 5A). The second music resource request is used to request the music resource of the song Love Story from the music FA. In some embodiments, the second music resource request includes the identifier of the song Love Story.

It should be noted that essential content of the first music resource request and essential content of the second music resource request are the same, and are both used to request the music resource of the song Love Story from the music FA. Representation forms of the first music resource request and the second music resource request may be the same or different. This is not limited in this application.

S113: The second server 502 sends the music resource to the music FA process (which corresponds to Step 7 in FIG. 5A). In some embodiments, the music resource is a resource of the song corresponding to the identifier of the song.

S114: The music FA process sends the music resource to the sound box FA process (which corresponds to Step 8 in FIG. 5A).

S115: The sound box FA process plays the song Love Story based on the music resource.

Still with reference to the scenario in FIG. 7, when the sound box plays the song Love Story, the sound box FA may return a song play notification to the terminal. The song play notification is used to notify the terminal of various information such as the song Love Story played by the sound box and play progress. In this way, an interface of the sound box FA on the display of the mobile phone changes from that shown in FIG. 8C to that shown in FIG. 8D. Compared with that in FIG. 8D, in FIG. 8C, on the card B 804 of the sound box FA, the song name Dangerously in FIG. 8C is changed to the song name Love Story in FIG. 8D, the singer name Charlie Puth of the song Dangerously in FIG. 8C is changed to a singer name Taylor Swift in FIG. 8D, and an operation button of a pause icon in FIG. 8C is changed to an operation button of a play icon in FIG. 8D. A remaining part on the interface of the sound box FA remains unchanged.

Figure 10D:
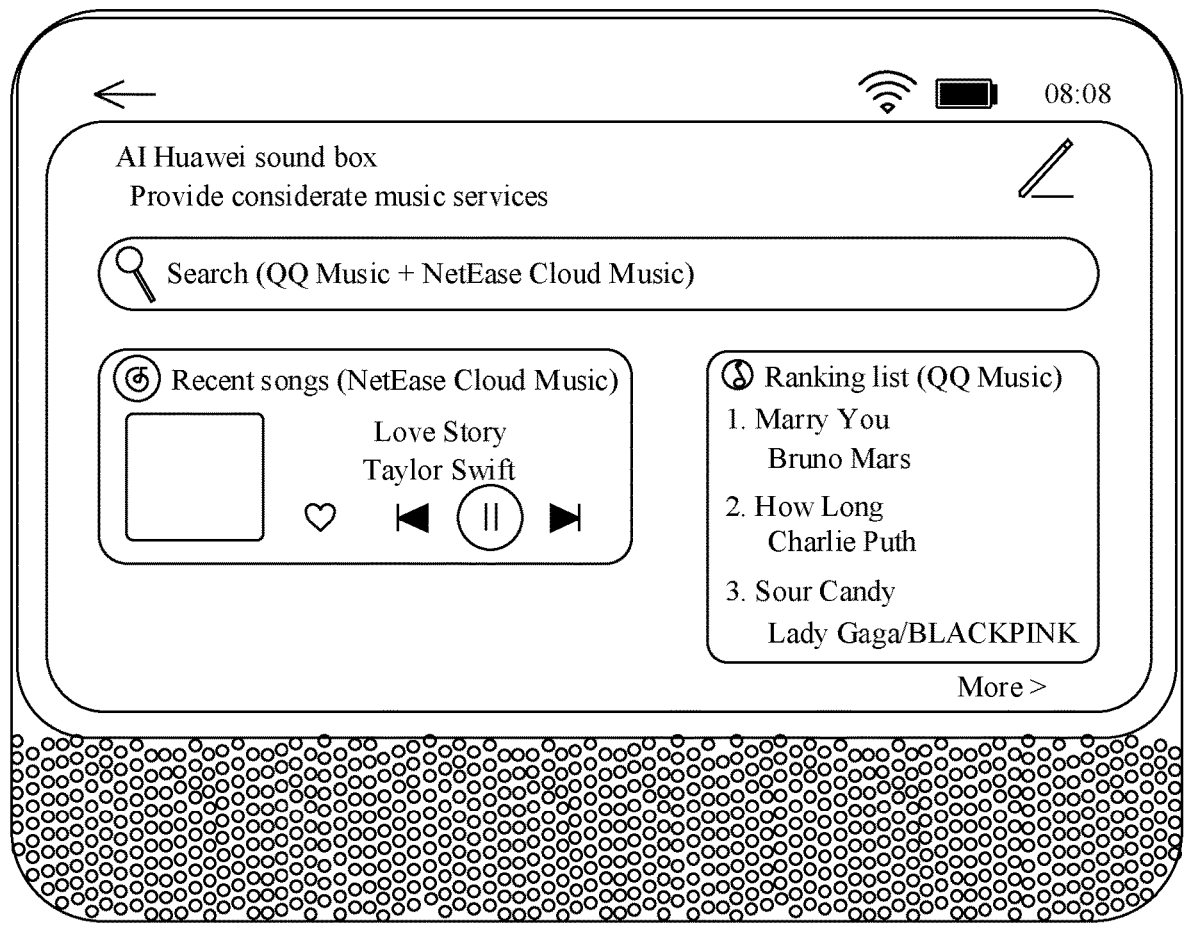

Still with reference to the scenario in FIG. 9, when the sound box includes the display, the interface of the sound box FA on the display of the sound box changes from that shown in FIG. 10C to that shown in FIG. 10D. Compared with that in FIG. 10D, in FIG. 10C, on the card B of the sound box FA, the song name Dangerously in FIG. 10C is changed to the song name Love Story in FIG. 10D, the singer name Charlie Puth of the song Dangerously in FIG. 10C is changed to the song name Taylor Swift in FIG. 10D, and an operation button of a pause icon in FIG. 10C is changed to an operation button of a play icon in FIG. 10D. A remaining part on the interface of the sound box FA remains unchanged.

Still with reference to the scenario in FIG. 11, when the sound box includes the display, the display of the sound box changes from the interface shown in FIG. 12 to another interface. The another interface may include but is limited to the song name of the song Love Story, the singer name Taylor Swift of the song Love Story, song lyrics, the operation button of the previous track icon, the operation button of the play/pause icon, the operation button of the next track icon, an operation button of a current song repeat icon, an operation button of a playlist icon, an operation button of a song play progress bar, a song start time point, a song end time point, and the like.

In conclusion, the sound box vendor may obtain a music resource from the server corresponding to the music FA by virtually integrating the music FA into the sound box FA (namely, a dependency relationship between the sound box FA and the music FA), and implement a song playing function based on the music resource.

Based on the foregoing descriptions, the sound box FA may have no interface, or may have an interface. If the sound box FA has the interface, the developer or the user may create the sound box FA by using the interface of the music FA, may develop a new interface to display the sound box FA, or may create the sound box FA in the foregoing two manners. This is not limited in this application.

In the following, the interface shown in FIG. 8B is used as an example of an interface of the sound box FA. With reference to FIG. 13A to FIG. 13H, an example is provided for a specific implementation in which a developer or a user creates a sound box FA on a mobile phone.

Figure 13A:
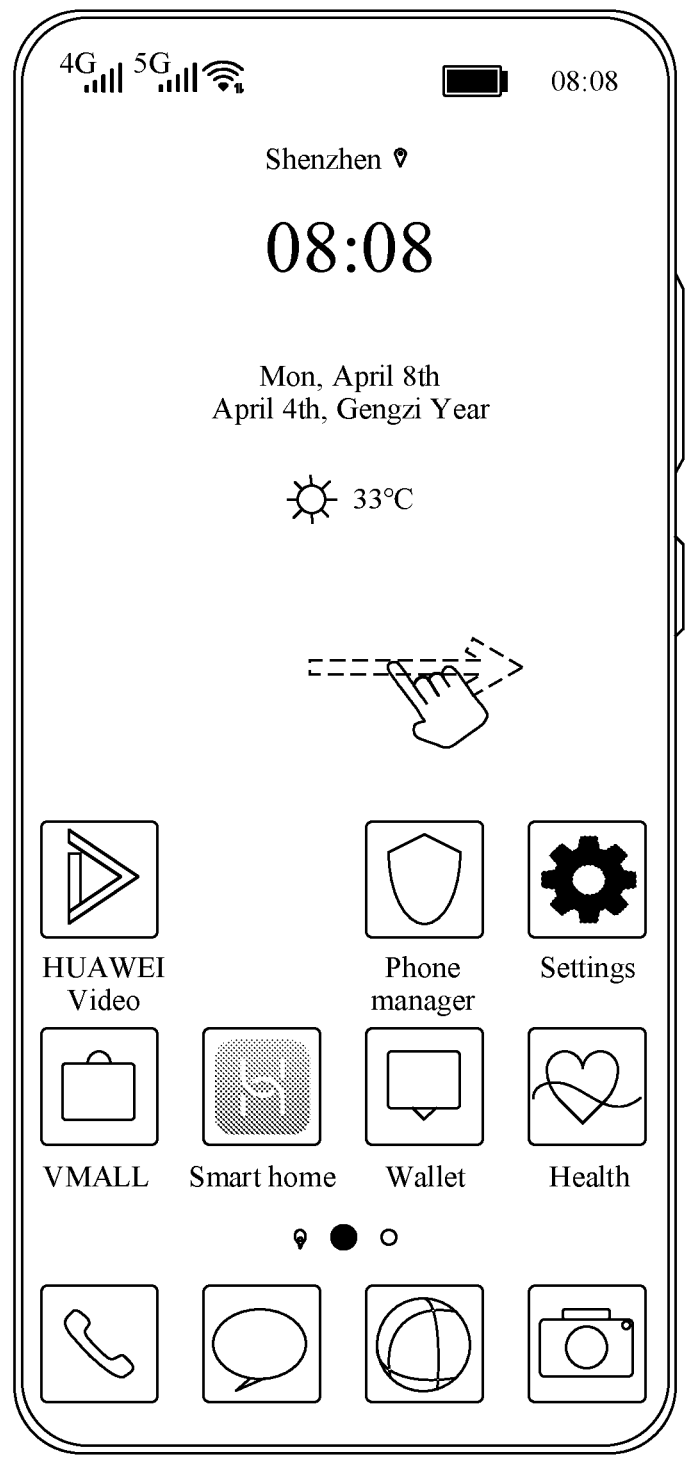
FIG. 13A to FIG. 13H each are a schematic diagram of a human-machine interaction interface according to an embodiment of this application.
Figure 13B:
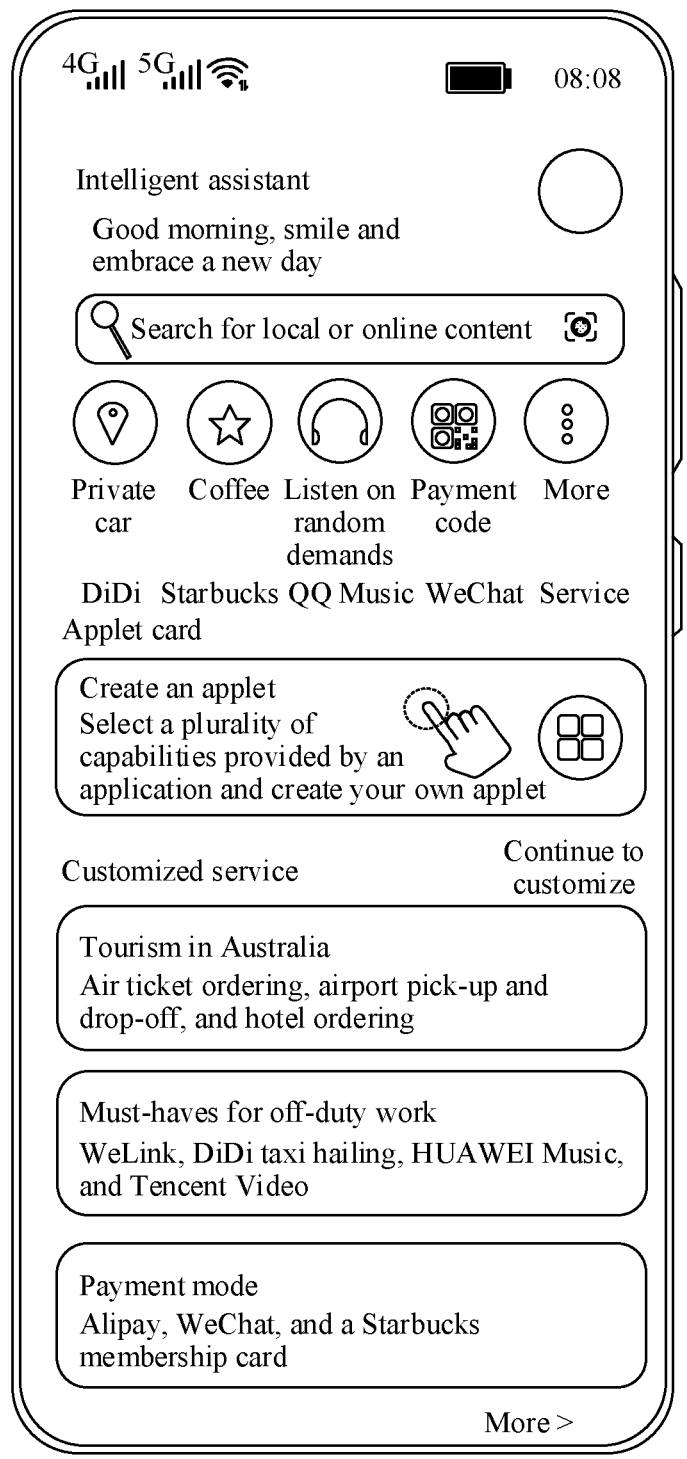
Figure 13C:
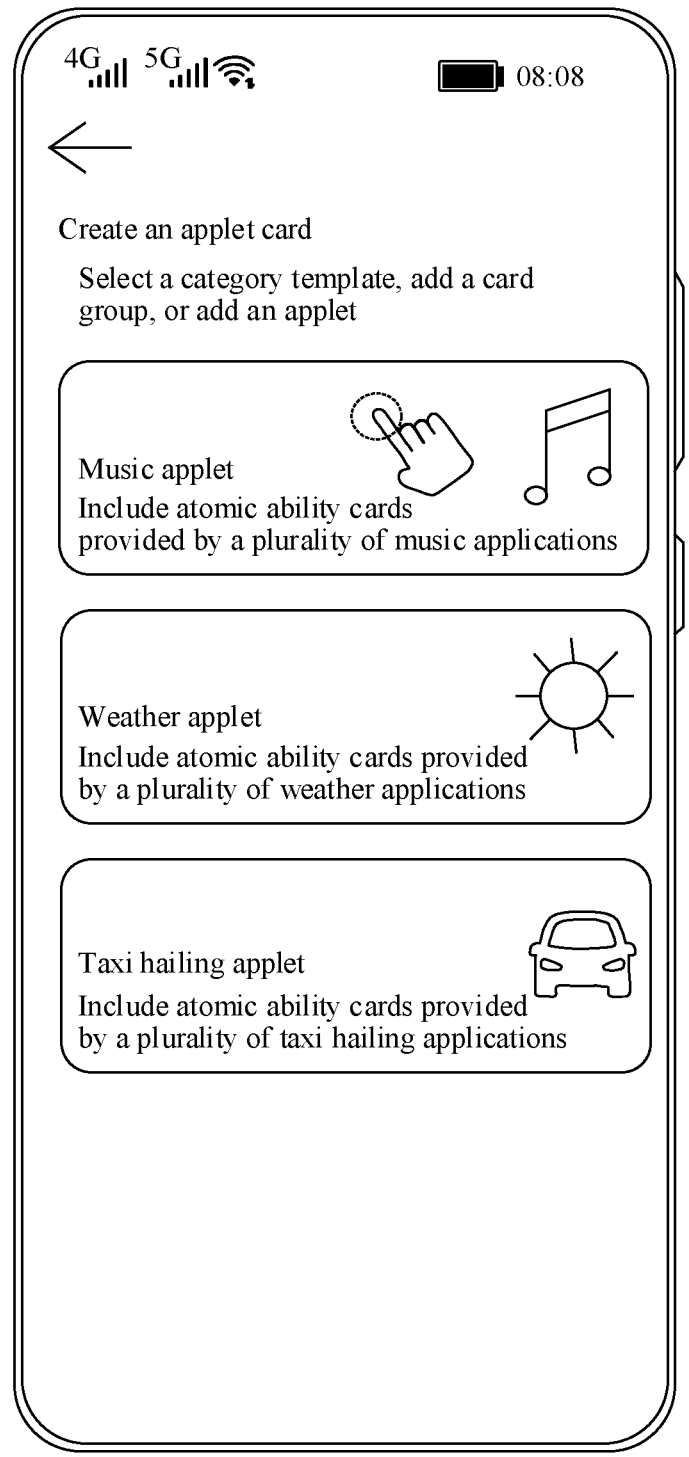

FIG. 13A to FIG. 13H each are a schematic diagram of a human-machine interaction interface according to an embodiment of this application. FIG. 13A shows an interface of a desktop of the mobile phone. The developer or the user slides rightward on the interface of the desktop of the mobile phone, and a display of the mobile phone displays an interface of a leftmost screen of the mobile phone shown in FIG. 13B. The developer or the user taps, on the interface of the leftmost screen, a card for creating an applet, and the display of the mobile phone displays an interface shown in FIG. 13C. The developer or the user taps a card of a music applet on the interface shown in FIG. 13C, and the display of the mobile phone displays an interface shown in FIG. 13D.

Text "Applet name" and an input box used for a text prompt "Please enter an applet card name" are displayed on the interface, so that the developer or the user names a created interface of the sound box FA.

The interface further includes text "Add a music card", text "All cards", and an option 1301. A card in the option 1301 is used to present a music FA to the user. The music FA herein may be a music FA that is downloaded by the mobile phone from an FA cloud server (for example, an FA application market), namely, a downloaded music FA, or may be a music FA that may be downloaded by the mobile phone from an FA cloud server (for example, an FA application market), namely, a downloadable music FA. Generally, when music FAs corresponding to different cards belong to a same music vendor, the different cards that belong to the same music vendor are displayed together, for example, arranged in a same rounded rectangular box. When music FAs corresponding to different cards belongs to different music vendors, the different cards are displayed separately, for example, arranged in different rounded rectangular boxes.

For example, there are two rounded rectangular boxes in the option 1301. One rounded rectangular box includes a card 1, a card 2, a card 3, and a card 4, and the other rounded rectangular box includes a card 5, a card 6, and a card 7.

A card name "QQ Music My Favorites", a QQ Music icon, and an operation button 1302 used to add the card 1 are displayed on the card 1. A card name "QQ Music Recent songs", a QQ Music icon, and an operation button 1302 used to add the card 2 are displayed on the card 2. A card name "QQ Music Ranking list", a QQ Music icon, and an operation button 1302 used to add the card 3 are displayed on the card 3. A card name "QQ Music Search box", a QQ Music icon, and an operation button 1302 used to add the card 4 are displayed on the card 4. A card name "NetEase Cloud Music Today's recommendation", a NetEase Cloud Music icon, and an operation button 1302 used to add the card 5 are displayed on the card 5. A card name "NetEase Cloud Music Recent songs", a NetEase Cloud Music icon, and an operation button 1302 used to add the card 6 are displayed on the card 6. A card name "NetEase Cloud Music Search box", a NetEase Cloud Music icon, and an operation button 1302 used to add the card 7 are displayed on the card 7. In addition, operation buttons 1302 of the card 1, the card 2, the card 3, the card 4, the card 5, the card 6, and the card 7 each are illustrated by using an icon including a plus sign in a circle as an example.

In addition, an operation button 1303 used to add a new card is further displayed on the interface. An icon including a plus sign in a circle is used as an example for illustration. If there is a newly downloaded card, the newly downloaded card is added to the option 1301.

Figure 13D:
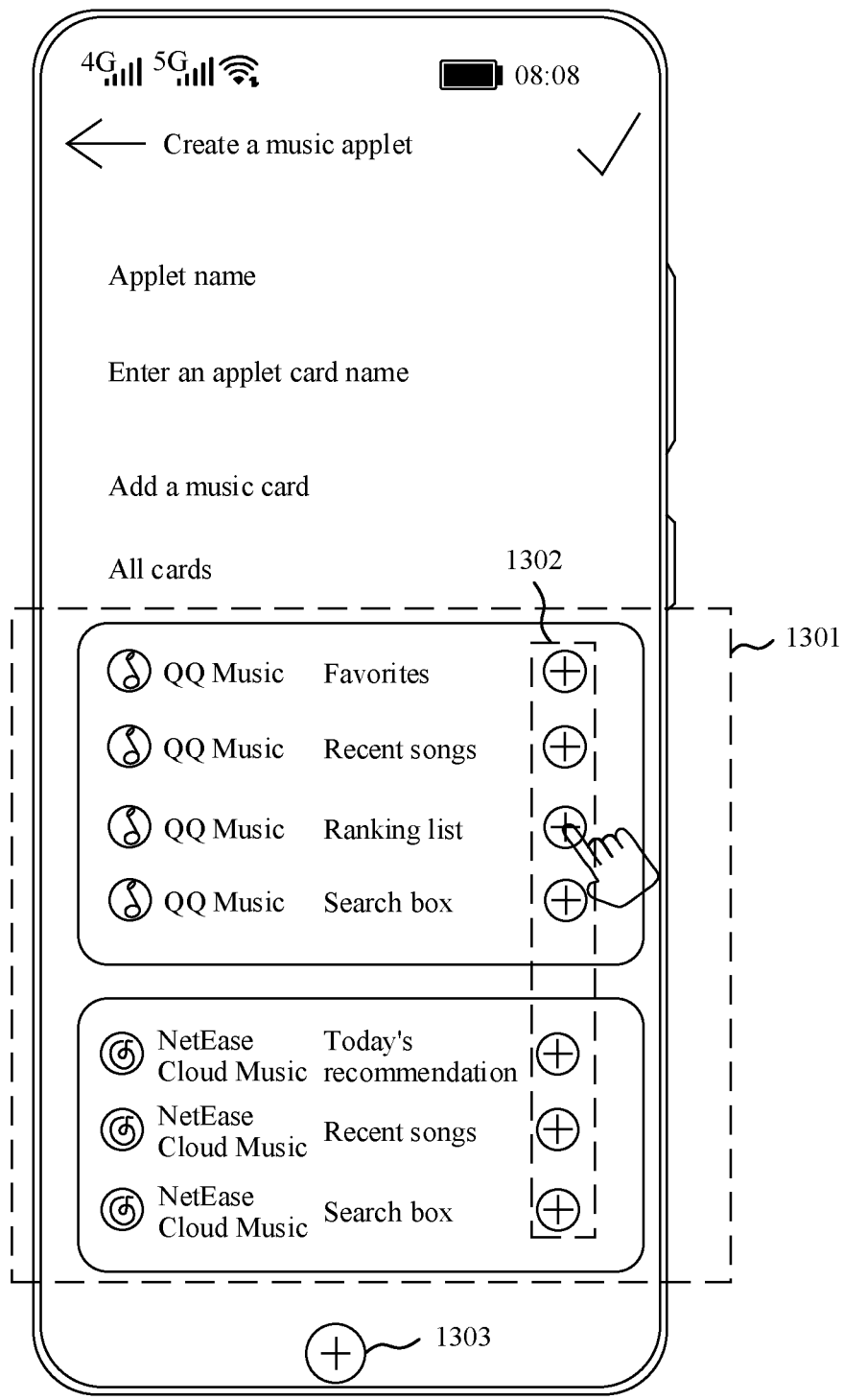

The developer or the user may select, from the interface shown in FIG. 13D, a downloaded card, for example, at least one of the card 1, the card 2, the card 3, the card 4, the card 5, the card 6, and the card 7, select a card newly downloaded from the FA cloud server, or select a downloaded card and a card newly downloaded from the FA cloud server.

Figure 13E:
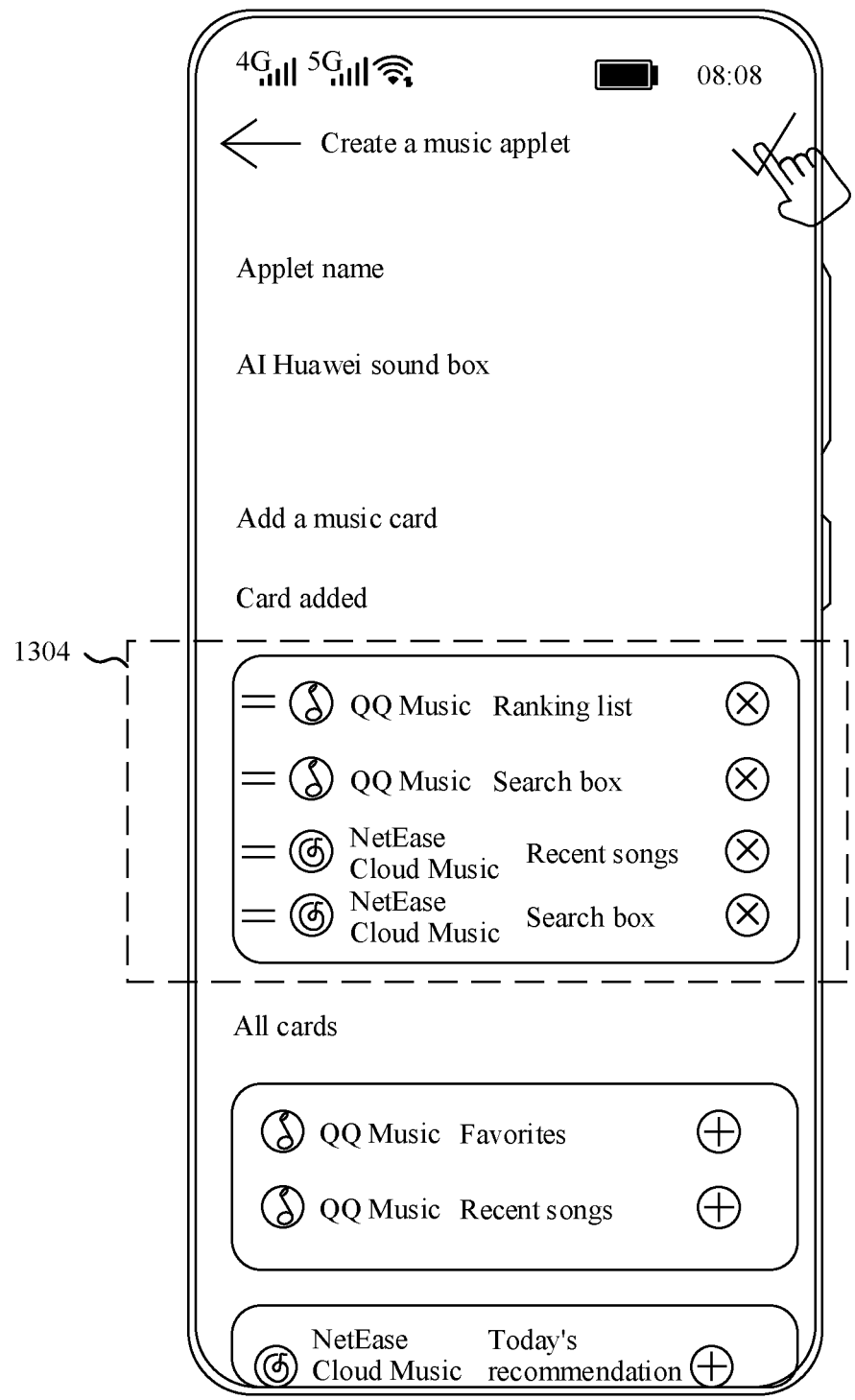

If the developer or the user selects the card 3, the card 4, the card 6, and the card 7, the display of the mobile phone displays an interface shown in FIG. 13E. Different from that on the interface shown in FIG. 13D, text "Card added" and an option 1304 are newly added to the interface, cards in the option 1304 are all cards (namely, the card 3, the card 4, the card 6, and the card 7) selected by the developer or the user, and the selected cards are removed from the cards in the option 1301 (that is, the card 3, the card 4, the card 6, and the card 7 are removed, and the card 1, the card 2, and the card 5 are retained).

Figure 13F:
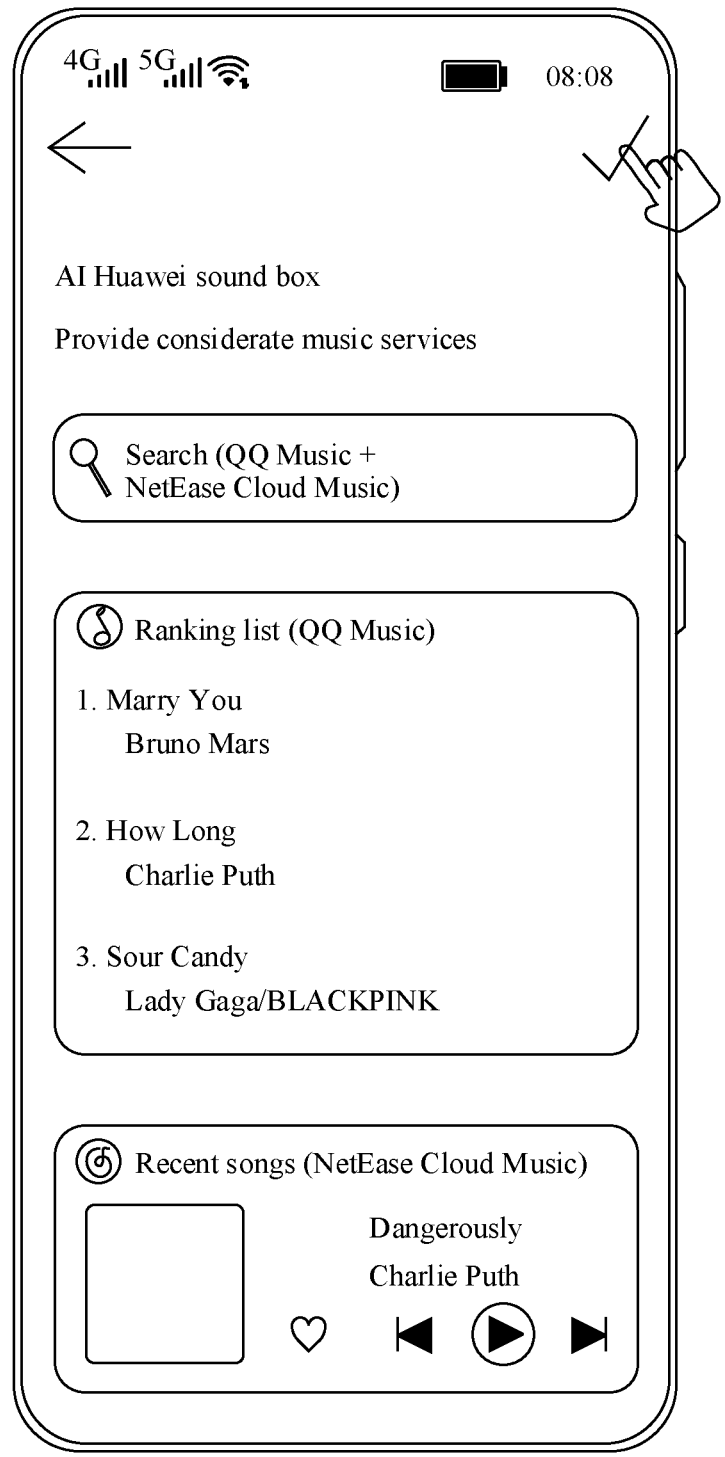
Figure 13G:
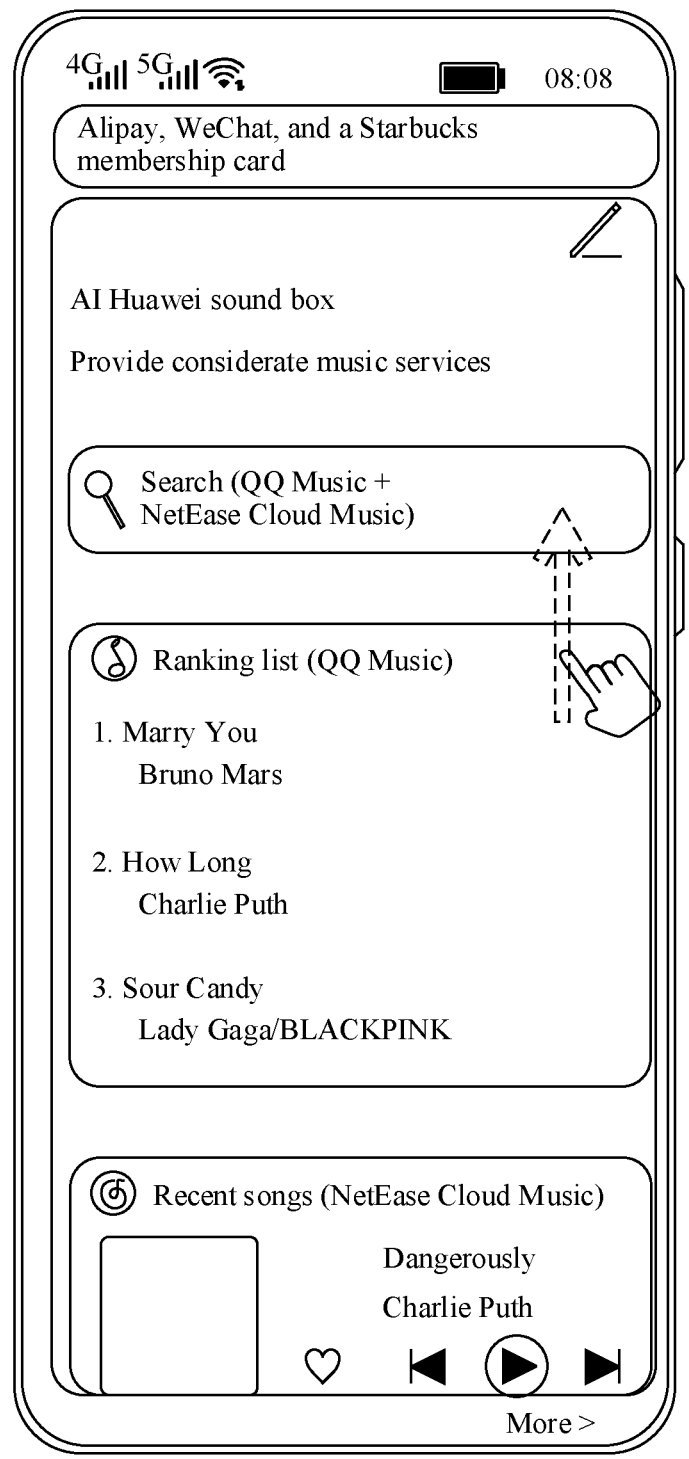

The developer or the user may tap a tick icon on the interface shown in FIG. 13E, and the display of the mobile phone displays an interface shown in FIG. 13F. The interface is used to provide a preview of the interface of the sound box FA for the developer or the user.

For example, on the interface of the sound box FA shown in FIG. 13E, a search box is displayed by using a self-developed interface, and a search result in the search box depends on a server of a QQ Music vendor and a server of a NetEase Cloud Music vendor. The card A corresponds to the card 3, and the card A is displayed by using an interface of a ranking list of the QQ Music. The card B corresponds to the card 6, and the card B is displayed by using a recent song interface of the NetEase Cloud Music.

In this way, the developer or the user can learn the interface of the sound box FA in time, and the developer or the user can modify the interface of the sound box FA in time. For example, the developer or the user taps a left arrow icon on the interface, and the display of the mobile phone returns to the interface shown in FIG. 13E, so that the developer or the user re-selects a card.

The developer or the user may tap a tick icon on the interface shown in FIG. 13F, and the interface of the sound box FA may be displayed on the interface of the leftmost screen of the mobile phone. An interface of the sound box FA shown in FIG. 13G continues to be displayed behind a payment manner card. If the interface of the sound box FA shown in FIG. 13G cannot be entirely displayed, the developer or the user slides downward on the interface shown in FIG. 13G, so that an interface of the sound box FA shown in FIG. 13H is entirely displayed on the display of the mobile phone.

In some other embodiments, the developer or the user may drag a first card embedded in a first application in a first device to a second application on the first device. Interfaces of first cards displayed by the first application and the second application may be the same, or may be different. This is not limited in this application. For example, the user drags the sound box FA displayed on the leftmost screen of the mobile phone to the desktop of the mobile phone, so that the sound box FA can also be displayed on the desktop. In this way, the sound box FA has abundant display channels.

In conclusion, the developer can formulate various types of interfaces of the sound box FA, to provide various interface selections for the user. The user may also customize various types of interfaces of the sound box FA, to implement customization of the personalized interface. In addition, when the user needs to use the sound box FA, the user may also download the sound box FA from the FA cloud server (for example, the FA application market), and install the sound box FA on the terminal or the sound box, for example, an icon of the sound box FA 801 shown in FIG. 8A or an icon of the sound box FA 1001 shown in FIG. 10A.

Figure 13H:
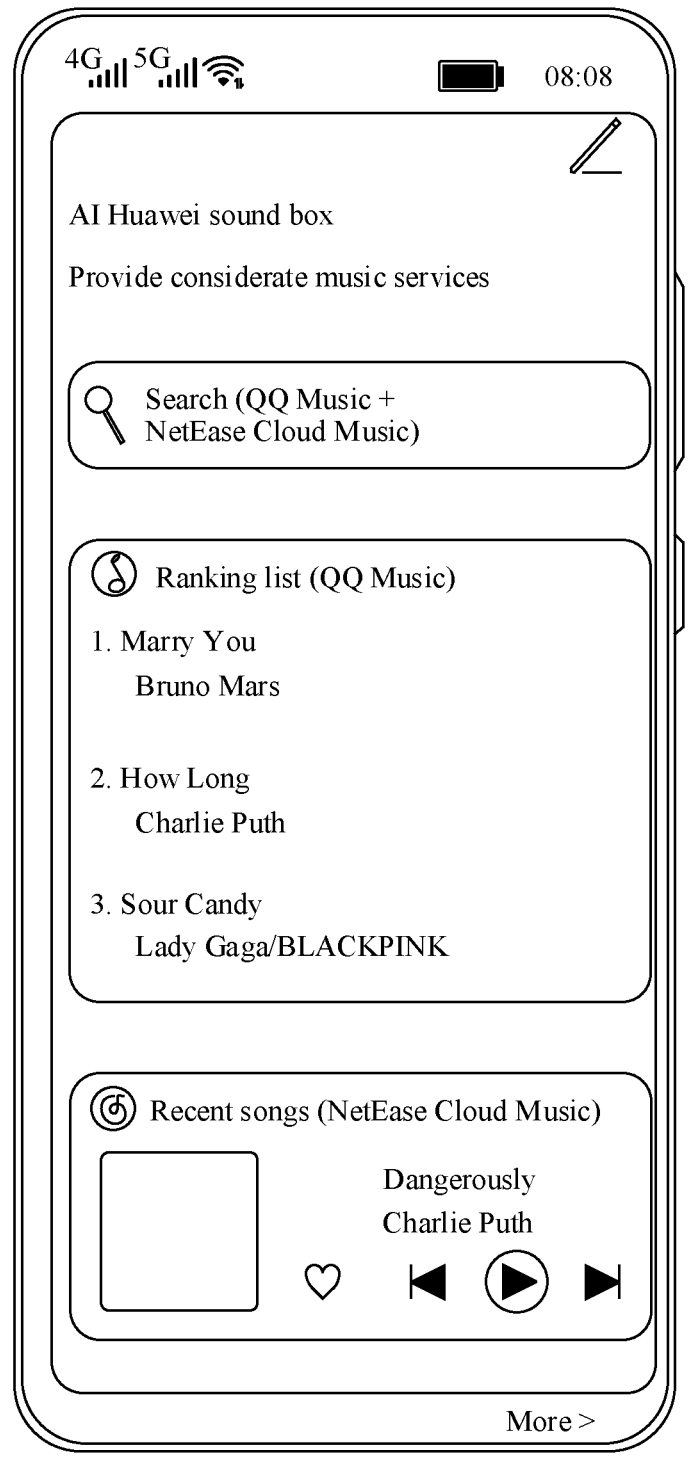

Based on the foregoing descriptions, still with reference to FIG. 13H, the following describes a specific implementation process in which the search result in the search box of the sound box FA depends on the server of the QQ Music vendor and the server of the NetEase Cloud Music vendor.

Figure 14:
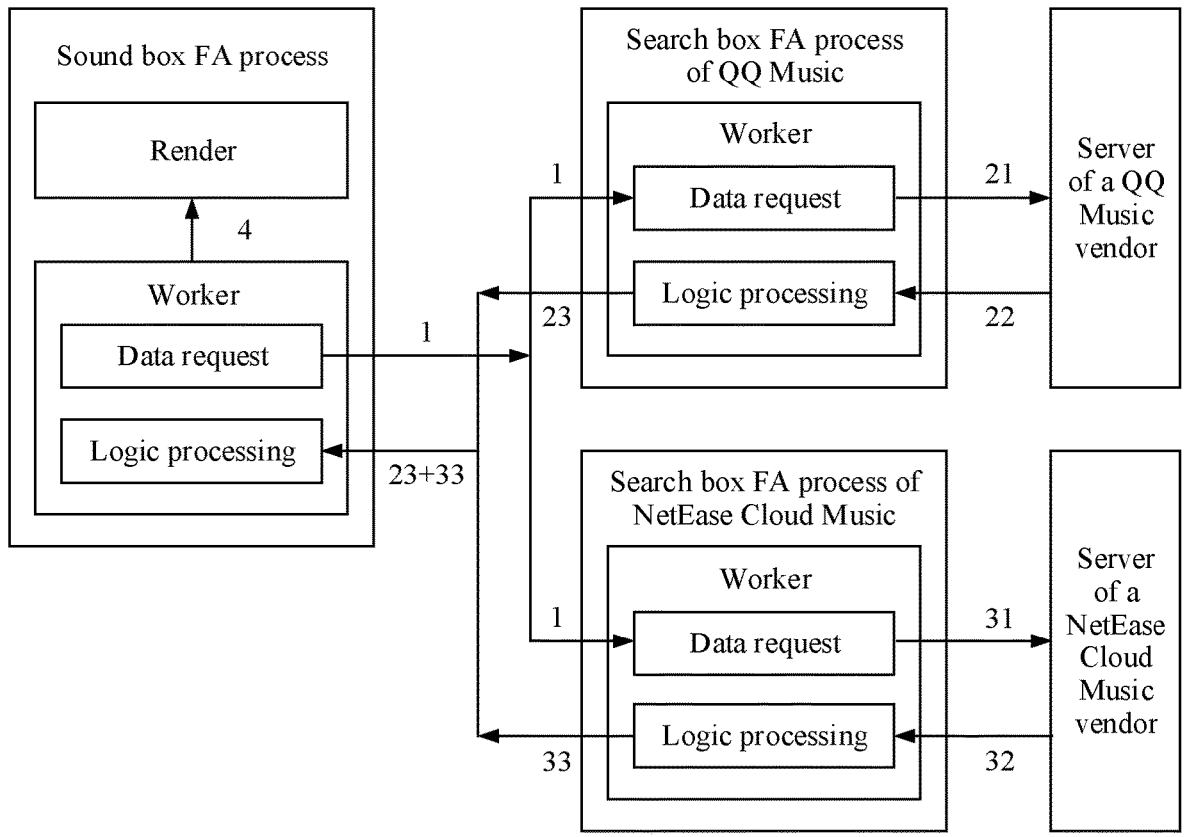
FIG. 14 is a schematic diagram of a software architecture in a scenario according to an embodiment of this application.

FIG. 14 is a schematic diagram of a software architecture in a scenario according to an embodiment of this application. When there is an input of the user (for example, Love Story) in the search box of the sound box FA, the sound box FA process sends, based on the input of the user, a search request to a search box FA process of the QQ Music and a search box FA process of the NetEase Cloud Music (which corresponds to Step 1 in FIG. 14).

The search box FA process of the QQ Music corresponds to a search box FA of the QQ Music. The search box FA process of the NetEase Cloud Music corresponds to a search box FA of the NetEase Cloud Music. In addition, the search box FA of the QQ Music is a service FA distributed by the QQ Music vendor to the FA cloud server (for example, the FA application market). The search box FA of the NetEase Cloud Music is a service FA distributed by the NetEase Cloud Music vendor to the FA cloud server (for example, the FA application market).

A worker thread in the search box FA process of the QQ Music sends a data request to the server of the QQ Music vendor by parsing the search request (which corresponds to Step 21 in FIG. 14). The server of the QQ Music vendor returns a search resource to the worker thread in the search box FA process of the QQ Music (which corresponds to Step 22 in FIG. 14). The worker thread in the search box FA process of the QQ Music performs logic processing on the search resource to obtain a corresponding search result, for example, QQ Music Love Story standard quality and QQ Music Love Story HQ high quality. The worker thread in the search box FA process of the QQ Music returns the search result to the sound box FA (which corresponds to Step 23 in FIG. 14).

Similarly, a worker thread in the search box FA process of the NetEase Cloud Music sends a data request to the server of the NetEase Cloud Music vendor by parsing the search request (which corresponds to Step 31 in FIG. 14). The server of the NetEase Cloud Music vendor returns a search resource to the worker thread in the search box FA process of the NetEase Cloud Music (which corresponds to Step 32 in FIG. 14). The worker thread in the search box FA process of the NetEase Cloud Music performs logic processing on the search resource to obtain a corresponding search result, for example, NetEase Cloud Music Love Story standard quality and NetEase Cloud Music Love Story high quality. The worker thread in the search box FA process of the NetEase Cloud Music returns the search result to the sound box FA (which corresponds to Step 33 in FIG. 14).

The worker thread in the sound box FA process sends search data to a render thread FA in the sound box FA process based on the search result returned by the search box FA process of the QQ Music and the search result returned by the search box FA process of the NetEase Cloud Music. The render thread in the sound box FA process performs rendering processing on the search data, so that the display of the mobile phone displays the interface shown in FIG. 8C. Parameters such as an arrangement manner, a location layout, and a display size of search results returned by different music vendors on the interface are not limited in this application.

It should be noted that, for a specific implementation in which the display of the mobile phone displays the interface in FIG. 10C, refer to the description content in which the display of the mobile phone displays the interface shown in FIG. 8C. Details are not described in this application again. In addition, because the input of the user causes the interface of the sound box FA to change, and the interface of the sound box FA does not need to jump, the search box FA of the QQ Music and the search box FA of the NetEase Cloud Music may be service FAs with UIs, may be service FAs without UIs, or may be service AAs without UIs. This is not limited in this application.

In conclusion, the search box of the sound box FA depends on search resources provided by the server of the QQ Music vendor and the server of the NetEase Cloud Music vendor. A search result can be display on an interface. In addition to the search resources provided by the server of the QQ Music vendor and the server of the NetEase Cloud Music vendor, the search box of the sound box FA may alternatively depend on the server of the sound box vendor to provide a search resource.

Based on the foregoing descriptions, content on the card B may change on the interface of the sound box FA. For example, the content of the card B changes from that in FIG. 8C to that in FIG. 8D, or changes from that in FIG. 10C to that in FIG. 10D. The following describes a specific implementation process of interface jumping by using an example in which the interface of the sound box FA is the interface shown in FIG. 13H.

Figure 15:
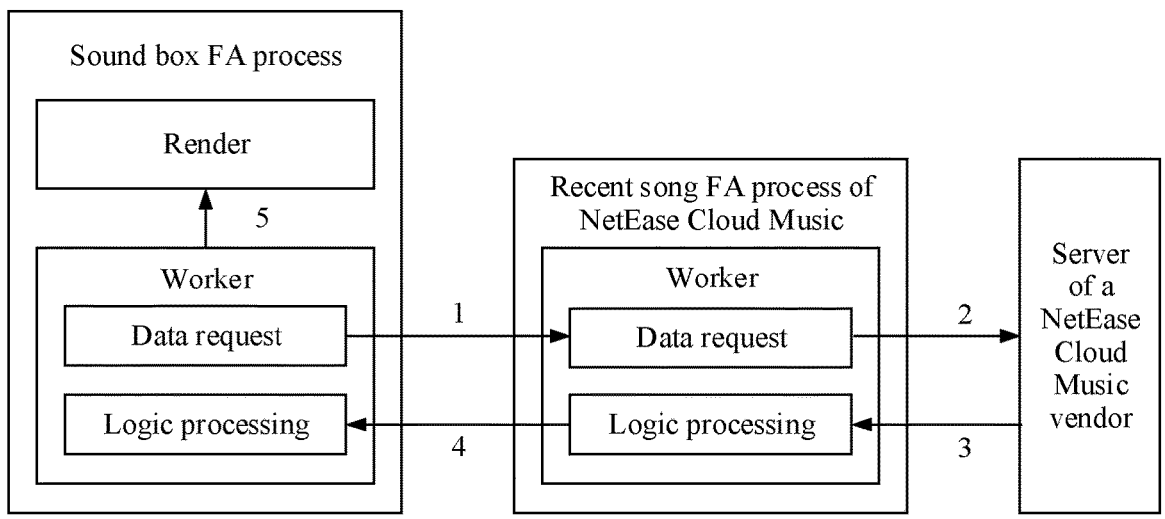
FIG. 15 is a schematic diagram of a software architecture in a scenario according to an embodiment of this application.

FIG. 15 is a schematic diagram of a software architecture in a scenario according to an embodiment of this application. When there is an input of the user for an operation button on the card B of the sound box FA (for example, an operation such as tapping), the sound box FA process sends, based on the input of the user, an interface display request to a recent song FA process of the NetEase Cloud Music (which corresponds to Step 1 in FIG. 15).

A worker thread in the recent song FA process of the NetEase Cloud Music sends a data request to the server of the NetEase Cloud Music vendor by parsing the interface display request (which corresponds to Step 2 in FIG. 15). The server of the NetEase Cloud Music vendor returns a requested resource to the worker thread in the recent song FA process of the NetEase Cloud Music (which corresponds to Step 3 in FIG. 15). The worker thread in the recent song FA process of the NetEase Cloud Music performs logic processing on the requested resource to obtain corresponding display data. The worker thread in the recent song FA process of the NetEase Cloud Music returns the display data to the worker thread in the sound box FA process (which corresponds to Step 4 in FIG. 15). The worker thread in the sound box FA process returns the display data to the render thread in the sound box FA process (which corresponds to Step 5 in FIG. 15). The render thread in the sound box FA process performs rendering processing on the display data, so that the display of the mobile phone displays the interface shown in FIG. 8D or FIG. 10D.

It should be noted that, because the input of the user requires an interface of a music FA to jump to the interface of the card B, a recent song FA of the NetEase Cloud Music is a service FA with a UI.

Because the input of the user causes the interface of the sound box FA to change, and the interface of the sound box FA does not need to jump, a search box FA of the QQ Music and a search box FA of the NetEase Cloud Music may be service FAs with UIs, may be service FAs without UIs, or may be service AAs without UIs. This is not limited in this application.

It should be noted that, because the input of the user causes the interface of the sound box FA to change, and the interface of the sound box FA does not need to jump, the recent song FA of the NetEase Cloud Music may be a service FA (that is, there may be a UI), or may be a service AA (that is, there may be no UI). This is not limited in this application.

In conclusion, content on the card B on the interface of the sound box FA depends on a resource provided by the recent song FA of the NetEase Cloud Music, so that the content on the card B on the interface of the sound box FA can be changed.

Based on the foregoing descriptions, the interface of the sound box FA may jump to the interface of the card A. The following describes a specific implementation process of interface jumping by using an example in which the interface of the sound box FA is the interface shown in FIG. 13H.

Figure 16A:
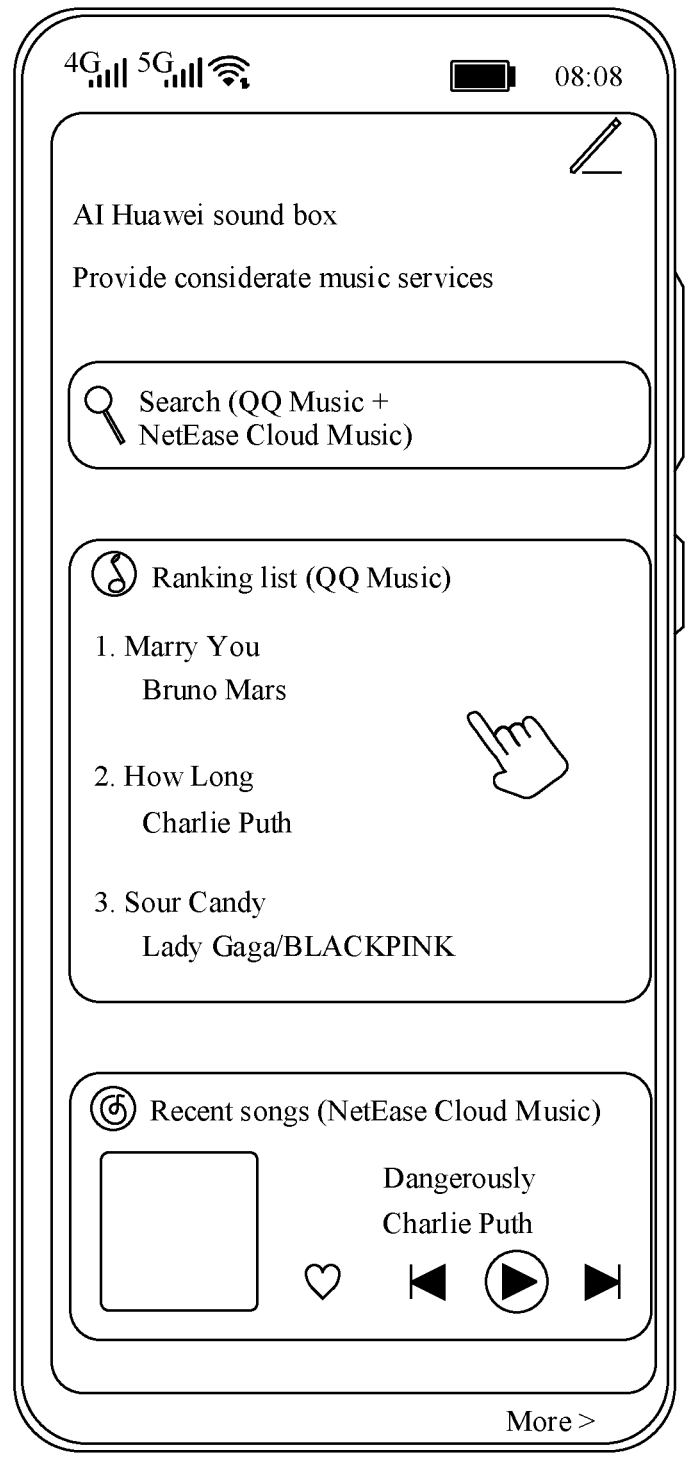
FIG. 16A and FIG. 16B each are a schematic diagram of a human-machine interaction interface according to an embodiment of this application.
Figure 16B:
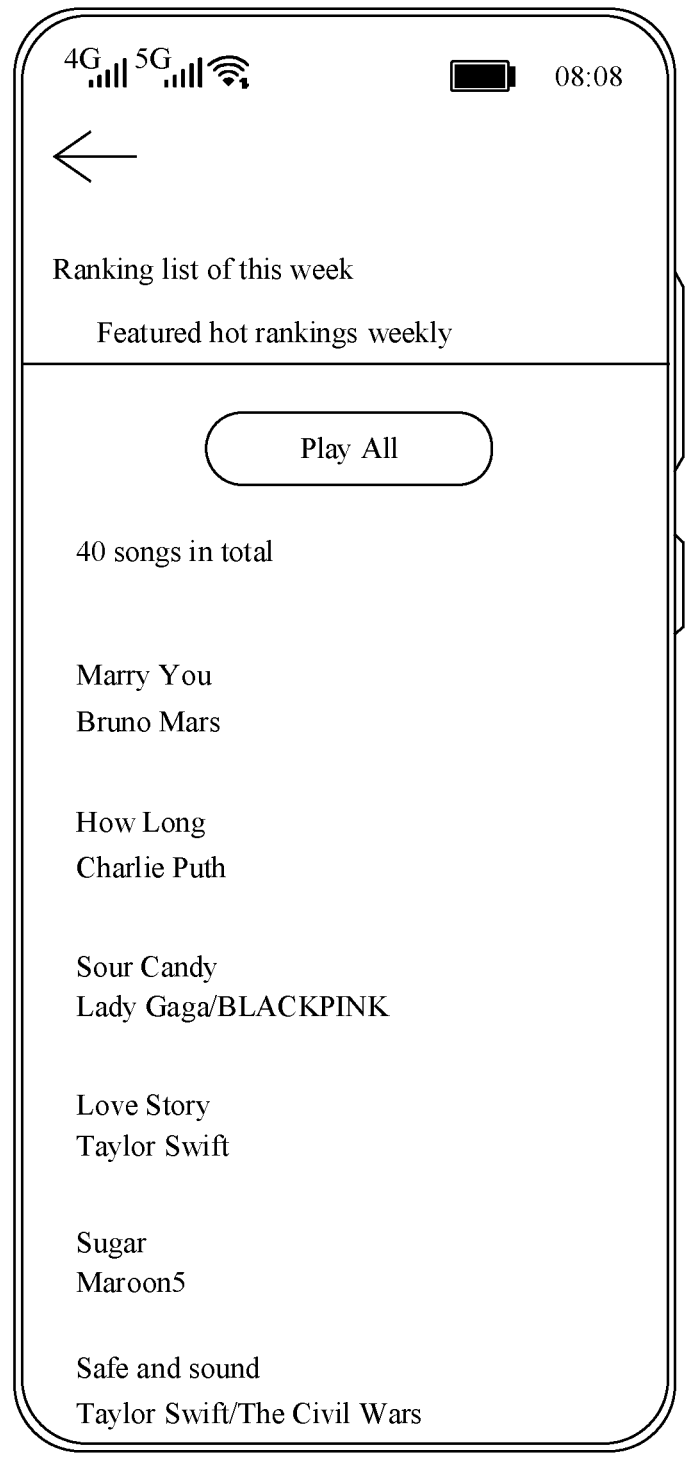

FIG. 16A and FIG. 16B each are a schematic diagram of a human-machine interaction interface according to an embodiment of this application. The user taps a blank area of the card A of the sound box FA on an interface shown in FIG. 16A, and the display of the mobile phone jumps to an interface of the card A shown in FIG. 16B. The interface is used to provide the user with a music resource from the ranking list of the QQ Music. For example, text "Ranking list of this week", "Featured hot rankings weekly", an operation button for playing all, text "40 songs in total", a song list (including a song name and a singer name of each song), and the like are displayed on the interface shown in FIG. 16B. In this way, the user can browse songs in the ranking list of the QQ Music.

Figure 17:
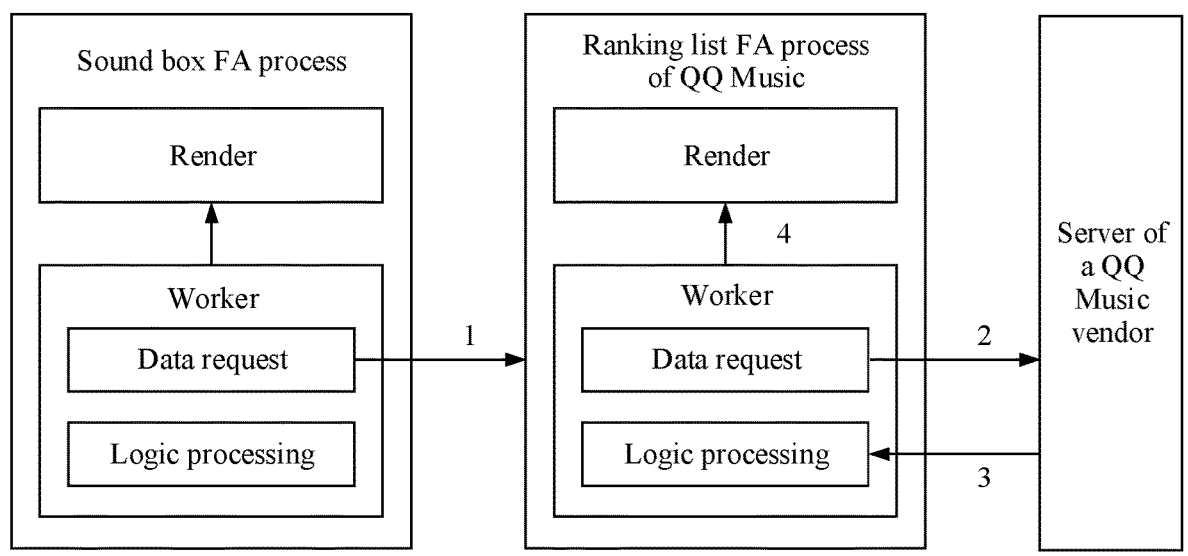
FIG. 17 is a schematic diagram of a software architecture in a scenario according to an embodiment of this application.

FIG. 17 is a schematic diagram of a software architecture in a scenario according to an embodiment of this application. When there is an input of the user in an area other than an operation button on the card A of the sound box FA, the sound box FA process sends, based on the input of the user, an interface jump request to a ranking list FA process of the QQ Music (which corresponds to Step 1 in FIG. 17). The ranking list FA process of the QQ Music corresponds to a ranking list FA of QQ Music. The ranking list FA of the QQ Music is a service FA distributed by the QQ Music vendor to the FA cloud server (for example, the FA application market).

A worker thread in the ranking list FA process of the QQ Music sends a data request to the server of the QQ Music vendor by parsing the interface jump request (which corresponds to Step 2 in FIG. 17). The server of the QQ Music vendor returns a requested resource to the worker thread in the ranking list FA process of the QQ Music (which corresponds to Step 3 in FIG. 17). The worker thread in the ranking list FA process of the QQ Music performs logic processing on the requested resource to obtain corresponding display data, for example, content on the interface shown in FIG. 16B. The worker thread in the ranking list FA process of the QQ Music returns the display data to a render thread in the ranking list FA process of the QQ Music (which corresponds to Step 4 in FIG. 17). The render thread in the ranking list FA process of the QQ Music performs rendering processing on the display data, so that the display of the mobile phone jumps to the interface of the card A shown in FIG. 16B.

It should be noted that, because the input of the user requires the interface of the sound box FA to jump to the interface of the card A, the ranking list FA of the QQ Music is a service FA with a UI.

In conclusion, the interface of the card A of the sound box FA depends on a resource provided by the ranking list FA of the QQ Music, so that jumping from the interface of the sound box FA to the interface of the card A can be implemented.

Based on the foregoing descriptions, the interface of the sound box FA may jump to the interface of the card B. The following describes a specific implementation process of interface jumping by using an example in which the interface of the sound box FA is the interface shown in FIG. 13H.

Figure 18:
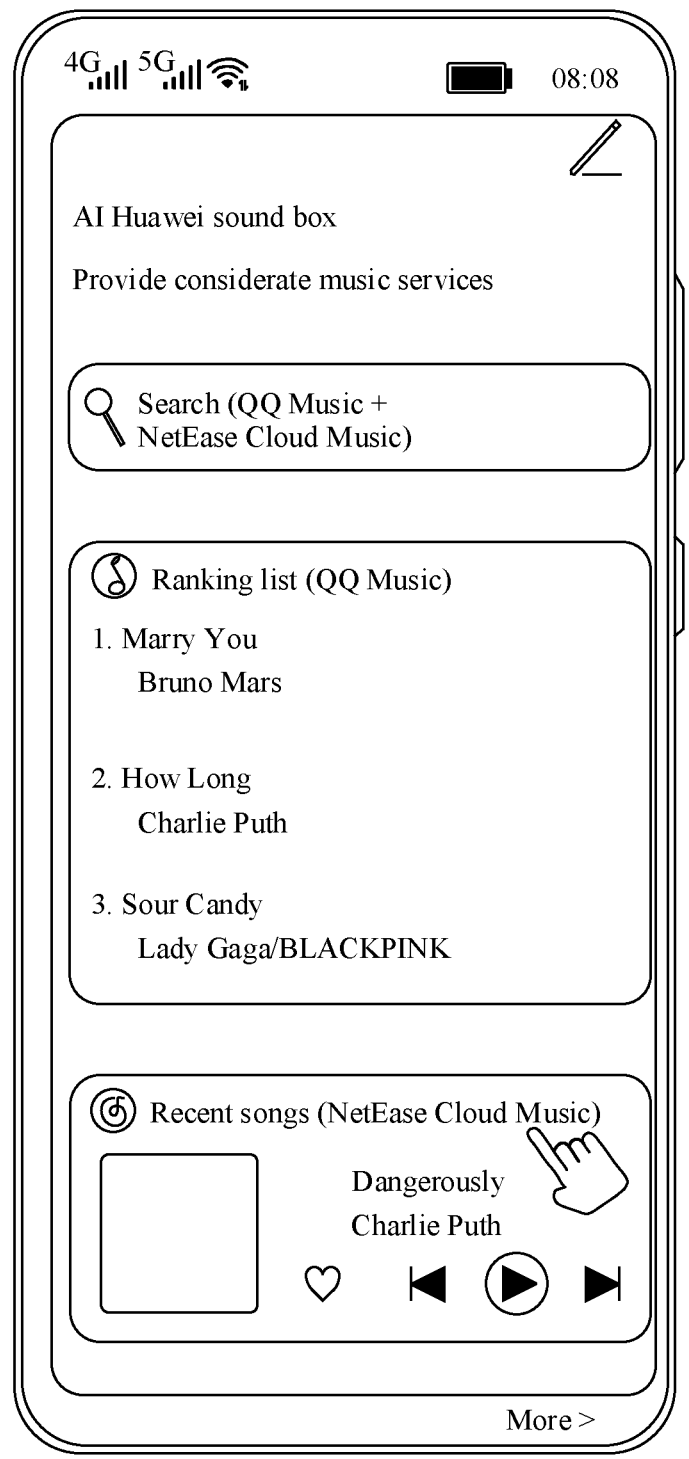
FIG. 18 is a schematic diagram of a human-machine interaction interface according to an embodiment of this application.

FIG. 18 is a schematic diagram of a human-machine interaction interface according to an embodiment of this application. The user taps a blank area of the card B of the sound box FA on an interface shown in FIG. 18, and the display of the mobile phone jumps to an interface of the card B. The interface is used to provide the user with a music resource of a recent song of the NetEase Cloud Music. For example, a song name of a song Love Story, a singer name of the song Love Story, lyrics of the song Love Story, an operation button of a previous track icon an operation button of a play/pause icon, an operation button of a next track icon, an operation button of a play mode, an operation button of a list of recent played records, and the like are displayed on the interface. In this way, the user can browse a song of a recent song of the NetEase Cloud Music.

Figure 19:
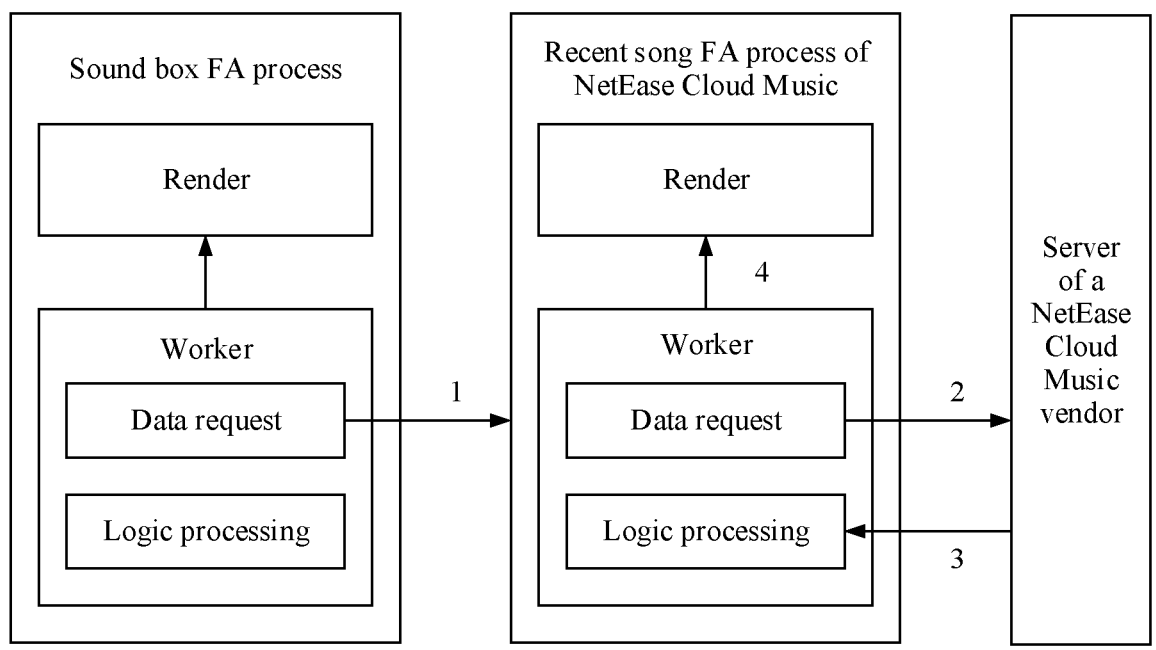
FIG. 19 is a schematic diagram of a software architecture in a scenario according to an embodiment of this application.

FIG. 19 is a schematic diagram of a software architecture in a scenario according to an embodiment of this application. When there is an input of the user in an area other than an operation button on the card B of the sound box FA, the sound box FA process sends, based on the input of the user, an interface jump request to a recent song FA process of NetEase Cloud Music (which corresponds to Step 1 in FIG. 19). The recent song FA process of the NetEase Cloud Music corresponds to a recent song FA of the NetEase Cloud Music. The recent song FA of the NetEase Cloud Music is a service FA distributed by the NetEase Cloud Music vendor to the FA cloud server (for example, the FA application market).

A worker thread in the recent song FA process of the NetEase Cloud Music sends a data request to the server of the NetEase Cloud Music vendor by parsing the interface jump request (which corresponds to Step 2 in FIG. 19). The server of the NetEase Cloud Music vendor returns a requested resource to the worker thread in the recent song FA process of the NetEase Cloud Music (which corresponds to Step 3 in FIG. 19). The worker thread in the recent song FA process of NetEase Cloud Music performs logic processing on the requested resource to obtain corresponding display data, for example, content on the interface. The worker thread in the recent song FA process of the NetEase Cloud Music returns the display data to a render thread in the recent song FA process of the NetEase Cloud Music (which corresponds to Step 4 in FIG. 19). The render thread in the recent song FA process of the NetEase Cloud Music performs rendering processing on the display data, so that the display of the mobile phone jumps to the interface of the card B.

It should be noted that, because the input of the user requires the interface of the music FA to jump to the interface of the card B, the recent song FA of the NetEase Cloud Music is a service FA with a UI.

In conclusion, the interface of the card B of the sound box FA depends on a resource provided by the recent song FA of the NetEase Cloud Music, so that jumping from the interface of the sound box FA to the interface of the card B can be implemented.

Based on some of the foregoing embodiments, the following describes a device control method provided in this application.

For example, this application provides a device control method.

The device control method in this application may include Step S201 to Step S208.

S201: A first device sends a first request to a first application process. The first application process corresponds to a first application, the first application is installed on the first device, and the first request is used to request a resource for executing a first response by the first device.

In this application, for step S201, refer to the foregoing descriptions of Step S103 or S104 shown in FIG. 5C-1 and FIG. 5C-2. For the first device, refer to the foregoing descriptions. For the first application, refer to the foregoing descriptions of the sound box FA. For the first application, refer to the foregoing descriptions of the sound box FA process. Details are not described herein again. A specific implementation of the first request is not limited in this application. In some embodiments, the first request may include an identifier of a second application.

S202: The first device sends a second request to a first server in response to the first request. The second request is used to request to obtain a second application, and the first application is associated with the second application.

In this application, for Step S202, refer to the foregoing descriptions of Step S107 shown in FIG. 5C-1 and FIG. 5C-2. For the second application, refer to the foregoing descriptions of the music FA process. For the second request, refer to the foregoing description of the music FA download request. For an association between the first application and the second application, refer to the foregoing descriptions in which the sound box FA has the dependency relationship with the music FA or the sound box FA is virtually integrated with the music FA. Details are not described herein again.

S203: The first device receives the second application from the first server.

In this application, that the first device receives the second application from the first server may be understood as: The first device receives a bundle of the second application, so that the first device installs the second application on the first device based on the bundle of the second application. For Step S203, refer to the foregoing descriptions of Step S108 and Step S109 shown in FIG. 5C-1 and FIG. 5C-2. Details are not described herein again.

S204: The first application process sends a third request to a second application process. The second application process corresponds to the second application, the first application process and the second application process are different processes, and the third request is used to request a resource for executing the first response by the first device.

In this application, for Step S204, refer to the foregoing descriptions of Step S110 and Step S111 shown in FIG. 5C-1 and FIG. 5C-2. For the third request, refer to the foregoing descriptions of the first music resource request. For the second application process, refer to the foregoing descriptions of the music FA process. Details are not described herein again. It should be noted that essential content of the second request and essential content of the third request are the same, and are both used to request a resource for executing the first response by the first device, but representation forms may be the same or different. This is not limited in this application.

S205: The second application process sends a fourth request to a server corresponding to the second application. The fourth request is used to request a resource for executing the first response by the first device.

In this application, for Step S205, refer to the foregoing descriptions of Step S112 shown in FIG. 5C-1 and FIG.

5C-2. For the fourth request, refer to the foregoing descriptions of the second music resource request. For the server corresponding to the second application, refer to the foregoing descriptions of the second server 502. Details are not described herein again.

S206: The second application process receives a first resource from the server corresponding to the second application. The first resource is used by the first device to execute the first response.

In this application, for Step S206, refer to the foregoing descriptions of Step S113 shown in FIG. 5C-1 and FIG. 5C-2. For the first resource, refer to the foregoing descriptions of the music resource. Details are not described herein again.

S207: The second application process sends the first resource to the first application process.

In this application, for Step S207, refer to the foregoing descriptions of Step S114 shown in FIG. 5C-1 and FIG. 5C-2. Details are not described herein again.

S208: The first device executes the first response based on the first resource.

In this application, for Step S208, refer to the foregoing descriptions of Step S114 shown in FIG. 5C-1 and FIG. 5C-2. For the first response, refer to the foregoing descriptions of playing the song Love Story. Details are not described herein again.

In some embodiments, before the first device sends the second request to the first server, the device control method in this application may further include: The first device determines, based on the fact that an identifier of the second application does not exist in a bundle manager service (Bundle Manager Service, BMS), that the second application is not installed on the first device. The BMS is used to store an identifier of an application that is installed on the first device. As a result, the first device may need to download and install the second device, so that the first application obtains, by using the second application, the resource for executing the first response. For a specific implementation process, refer to the foregoing descriptions of Step S106 to Step S109 shown in FIG. 5C-1 and FIG. 5C-2. Details are not described herein again.

In some embodiments, after the first device receives the second application from the first server, the method may further include: The first device installs the second application on the first device, and stores the identifier of the second application in the BMS. In this way, the first device may confirm that the second device is installed on the first device, so that the first application obtains, by using the second application, the resource for executing g the first response. For a specific implementation process, refer to the foregoing descriptions of Step S106 shown in FIG. 5C-1 and FIG. 5C-2. Details are not described herein again.

In some embodiments, the first device stores a configuration file of the first application, and the configuration file of the first application includes the identifier of the second application. The second request carries the identifier of the second application. In this application, for a specific implementation process, refer to the foregoing descriptions. Details are not described herein again.

In some embodiments, the device control method in this application may further include Step S301 to Step S307.

S301: The first device sends a fifth request to the first server in response to the first request. The fifth request is used to request to obtain a third application, and the first application is associated with the third application.

S302: The first device receives the third application from the first server.

S303: The first application process sends a sixth request to a third application process. The third application process corresponds to the third application, the first application process and the third application process are different processes, and the sixth request is used to request a resource for executing the first response by the first device.

S304: The third application process sends a seventh request to a server corresponding to the third application. The seventh request is used to request a resource for executing the first response by the first device.

S305: The third application process receives a second resource from the server corresponding to the third application. The second resource is used by the first device to execute the first response.

S306: The third application process sends the second resource to the first application process.

S307: The first device executes the first response based on the first resource and the second resource.

In this application, the first application on the first device may virtually integrate both the second application and the third application. To be specific, for a specific process in which the first application obtains the resource by using the third application in Step S301 to Step S307, refer to the descriptions in which the first application obtains the resource by using the second application. For the second resource, refer to the foregoing descriptions of the music resource. Details are not described herein again.

In some embodiments, the first device receives a first instruction from a second device, and the first device is communicatively connected to the second device. The first device sends the first request to the first application process in response to the first instruction. In this application, for a specific implementation process, refer to the foregoing descriptions shown in FIG. 7 to FIG. 8D. For the first instruction, refer to the foregoing descriptions of the input operation of the user. Details are not described herein again.

In some embodiments, the first device sends the first request to the first application process in response to a first operation of a user. In this application, for a specific implementation process, refer to the foregoing descriptions shown in FIG. 9 to FIG. 10D and FIG. 11 to FIG. 12. For the first operation of the user, refer to the foregoing descriptions of the input operation of the user. Details are not described herein again.

In some embodiments, the device control method in this application may further include: A display in the first device displays an interface of the first application. The interface of the first application includes a first area, and an interface displayed in the first area is provided by the second application. In this application, for a specific implementation process, refer to the foregoing descriptions shown in FIG. 13A to FIG. 13G. Details are not described herein again.

In some embodiments, the device control method in this application may further include: The first device releases a resource of the second application when a preset condition is met, that is, the first device may terminate the second application process, and release a related resource of the second application in a memory of the first device. The preset presetting may include but is limited to whether a space occupation ratio of the second application exceeds a preset ratio, whether remaining space of the first device is less than a preset size, whether a quantity of applications in the second application exceeds a preset quantity, whether running duration of the second application when the second application is not invoked exceeds preset duration, and the like.

In some embodiments, the device control method in this application may further include: The first application process stops invoking the second application process, that is, the first application process no longer starts the second application process, so that the second application process may be invoked by another process. For example, the first device may set a flag for the first application process to stop invoking the second application process. When a value of the flag is a preset value, the first device may determine that the first application process stops invoking the second application process.

In some embodiments, the device control method in this application may further include Step S401 to Step S407.

S401: The first device sends an eighth request to a fourth application process. The fourth application process corresponds to a fourth application, the fourth application is installed on the first device, the fourth application is associated with the second application, and the eighth request is used to request a resource for executing a second response by the first device.

S402: The fourth application process sends a ninth request to the second application process. The fourth application process and the second application process are different processes, and the ninth request is used to request a resource for executing the second response by the first device.

S403: The second application process sends a tenth request to the server corresponding to the second application. The tenth request is used to request a resource for executing the second response by the first device.

S404: The second application process receives a third resource from the server corresponding to the second application. The third resource is used by the first device to execute the second response.

S405: The second application process sends the third resource to the fourth application process.

S406: The first device executes the second response based on the third resource.

In this application, in addition to the first application, the fourth application may be installed on the first device, and the second application and the fourth application may separately invoke the third application. For a specific implementation process in which the fourth application implements, by using the second application, that the first device executes the second response in Step S401 to Step S407, refer to the foregoing descriptions of the specific implementation process in which the first application implements, by using the second application, that the first device executes the first response. Details are not described herein again.

In some embodiments, when the first device is a sound box, the first application is a sound box FA application, the second device is a music FA application, and the first server is an FA cloud server, the device control method in this application may include step S501 to step S513.

S501: The sound box requests to invoke a sound box FA process. The sound box FA process corresponds to the sound box FA application, and the sound box FA application is installed on the sound box.

S502: The sound box determines whether the sound box FA process is run.

S503: When the sound box FA process is not run, the sound box invokes the sound box FA process, and sends an identifier of a target song to the sound box FA process.

S504: When the sound box FA process is run, the sound box sends an identifier of a target song to the sound box FA process.

S505: The sound box FA process requests to invoke a music FA process.

S506: The sound box determines whether an identifier of the music FA application exists in a BMS, to determine whether a bundle of the music FA application exists in the sound box. The music FA process corresponds to the music FA application, and the BMS stores an identifier of an FA application associated with the sound box FA application.

S507: If the identifier of the music FA application does not exist in the BMS, an operating system of the sound box sends, to the FA cloud server, a request for downloading the music FA application. The request for downloading the music FA application is used to request the bundle of the music FA application, and the request for downloading the music FA application carries the identifier of the music FA application. The operating system of the sound box receives the bundle of the music FA application from the FA cloud server. The operating system of the sound box unpacks the bundle of the music FA application, installs the music FA application on the sound box, stores the identifier of the music FA application in the BMS, and continues to determine whether the identifier of the music FA application exists in the BMS until the identifier of the music FA application exists in the BMS.

S508: If the identifier of the music FA application exists in the BMS, the sound box FA process invokes the music FA process.

S509: The sound box FA process sends a first music resource request to the music FA process. The first music resource request is used to request a music resource of the target song, and the first music resource request carries the identifier of the target song.

S510: The music FA process sends a second music resource request to a server corresponding to the music FA application. The second music resource request is used to request the music resource of the target song, and the second music resource request carries the identifier of the target song.

S511: The music FA process receives the music resource of the target song from the server corresponding to the music FA application.

S512: The music FA process sends the music resource of the target song to the sound box FA process.

S513: The sound box plays the target song based on the music resource of the target song.

In this application, for a specific implementation process of Step S501 to Step S513, refer to the foregoing descriptions. Details are not described herein again.

For example, this application further provides an electronic device. The electronic device may include at least one memory and at least one processor. The memory is configured to store program instructions. The processor is configured to invoke the program instructions in the memory, to enable the first device to perform the device control method in the foregoing embodiment.

For example, this application further provides a computer program product, including executable instructions. The executable instructions are stored in a readable storage medium. At least one processor of an electronic device may read the executable instructions from the readable storage medium, and the at least one processor executes the executable instructions, to enable the electronic device to implement the device control method in the foregoing embodiment.

For example, this application further provides a computer-readable storage medium. The computer-readable storage medium stores a computer program. When the computer program is executed by a processor, an electronic device is enabled to implement the device control method in the foregoing embodiment.

In the foregoing embodiments, all or some of the functions may be implemented by using software, hardware, or a combination of software and hardware. When software is used to implement the foregoing embodiments, all or some of embodiments may be implemented in a form of a computer program product. The computer program product includes one or more computer instructions. When the computer program instructions are loaded and executed on a computer, all or some of the processes or functions according to embodiments of this application are generated. The computer may be a general-purpose computer, a dedicated computer, a computer network, or another programmable apparatus. The computer instructions may be stored in a computer-readable storage medium. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid state disk (solid state disk, SSD)), or the like.

A person of ordinary skill in the art may understand that all or some of the processes of the methods in embodiments may be implemented by a computer program instructing relevant hardware. The program may be stored in a computer-readable storage medium. When the program runs, the processes of the method embodiments are performed. The foregoing storage medium includes any medium that can store program code, such as a ROM, a random access memory RAM, a magnetic disk, or an optical disc.

The invention claimed is:

1. A device control method, comprising:
   sending, by a first device to a first application process, a first request corresponding to a first application installed on the first device, the first request being used to request a resource for executing a first response by the first device;
   sending, by the first device in response to the first request, a second request to a first server, wherein the second request is used to request to obtain a second application associated with the first application;
   receiving, by the first device, the second application from the first server;
   sending, by the first application process, a third request to a second application process, wherein the second application process corresponds to the second application and is different from the first application process, and the third request is used to request a resource for executing the first response by the first device;
   sending, by the second application process, a fourth request to a server corresponding to the second application, wherein the fourth request is used to request a resource for executing the first response by the first device;
   receiving, by the second application process, a first resource from the server corresponding to the second application, wherein the first resource is used by the first device to execute the first response;
   sending, by the second application process, the first resource to the first application process; and
   executing, by the first device based on the first resource, the first response.

2. The method according to claim 1, wherein before sending, by the first device, the second request to the first server, the method further comprises:
   determining, by the first device based on the fact that an identifier of the second application does not exist in a bundle manager service (BMS), that the second application is not installed on the first device, wherein the BMS is configured to store an identifier of an application that is installed on the first device.

3. The method according to claim 2, wherein after receiving, by the first device, the second application from the first server, the method further comprises:
   installing, by the first device, the second application on the first device; and
   storing the identifier of the second application in the BMS.

4. The method according to claim 1, wherein the first device stores a configuration file of the first application, the configuration file of the first application comprises the identifier of the second application, and the second request carries the identifier of the second application.

5. The method according to claim 1, the method further comprising:
   sending, by the first device in response to the first request, a fifth request to the first server, wherein the fifth request is used to request to obtain a third application associated with the first application;
   receiving, by the first device, the third application from the first server;
   sending, by the first application process, a sixth request to a third application process, wherein the third application process corresponds to the third application and is different from the first application process, and the sixth request is used to request a resource for executing the first response by the first device;
   sending, by the third application process, a seventh request to a server corresponding to the third application, wherein the seventh request is used to request a resource for executing the first response by the first device;
   receiving, by the third application process, a second resource from the server corresponding to the third application, wherein the second resource is used by the first device to execute the first response;
   sending, by the third application process, the second resource to the first application process; and
   executing, by the first device, the first response based on the first resource and the second resource.

6. The method according to claim 1, wherein the method further comprises:
   displaying, by a display in the first device, an interface of the first application, wherein the interface of the first application comprises a first area, and an interface displayed in the first area is provided by the second application.

7. The method according to claim 1, wherein the method further comprises:
   stopping, by the first application process, invoking the second application process.

8. The method according to claim 7, wherein the method further comprises:
   sending, by the first device an eighth request to a fourth application process, wherein the fourth application process corresponds to a fourth application installed on the first device, the fourth application is associated with the second application, and the eighth request is used to request a resource for executing a second response by the first device;

sending, by the fourth application process, a ninth request to the second application process, wherein the fourth application process and the second application process are different processes, and the ninth request is used to request a resource for executing the second response by the first device;

sending, by the second application process, a tenth request to the server corresponding to the second application, wherein the tenth request is used to request a resource for executing the second response by the first device;

receiving, by the second application process, a third resource from the server corresponding to the second application, wherein the third resource is used by the first device to execute the second response;

sending, by the second application process, the third resource to the fourth application process; and executing, by the first device, the second response based on the third resource.

9. A first device, comprising:
one or more processors;
a memory coupled to the one or more processors and configured to store program instructions that, when executed by the one or processors, cause the first device to perform:
sending a first request to a first application process, wherein the first application process corresponds to a first application installed on the first device, and the first request is used to request a resource for executing a first response by the first device;
sending a second request to a first server in response to the first request, wherein the second request is used to request to obtain a second application, and the first application is associated with the second application;
receiving the second application from the first server;
sending, by the first application process, a third request to a second application process, wherein the second application process corresponds to the second application and is different from the first application process, and the third request is used to request a resource for executing the first response by the first device;
sending, by the second application process a fourth request to a server corresponding to the second application, wherein the fourth request is used to request a resource for executing the first response by the first device;
receiving, by the second application process, a first resource from the server corresponding to the second application, wherein the first resource is used by the first device to execute the first response;
sending, by the second application process, the first resource to the first application process; and
executing the first response based on the first resource.

10. The device according to claim 9, wherein the processor is further configured to execute the program instructions to perform:
determining, based on the fact that an identifier of the second application does not exist in a bundle manager service (BMS), that the second application is not installed on the first device, wherein the BMS is configured to store an identifier of an application that is installed on the first device.

11. The device according to claim 10, wherein the processor is further configured to execute the program instructions to perform:

installing the second application on the first device, and storing the identifier of the second application in the BMS.

12. The device according to claim 9, wherein the memory is configured to store a configuration file of the first application, the configuration file of the first application comprises the identifier of the second application, and the second request carries the identifier of the second application.

13. The device according to claim 9, wherein the processor is further configured to execute the program instructions to perform:
sending a fifth request to the first server in response to the first request, wherein the fifth request is used to request to obtain a third application associated with the first application;
receiving the third application from the first server;
sending, by the first application process, a sixth request to a third application process, wherein the third application process corresponds to the third application is different from the third application process, and the sixth request is used to request a resource for executing the first response by the first device;
sending, by the third application process, a seventh request to a server corresponding to the third application, wherein the seventh request is used to request a resource for executing the first response by the first device;
receiving, by the third application process, a second resource from the server corresponding to the third application, wherein the second resource is used by the first device to execute the first response;
sending, by the third application process, the second resource to the first application process; and
executing the first response based on the first resource and the second resource.

14. The device according to claim 9, wherein the processor is further configured to execute the program instructions to perform:
displaying an interface of the first application by a display in the first device, wherein the interface of the first application comprises a first area, and an interface displayed in the first area is provided by the second application.

15. The device according to claim 9, wherein the processor is further configured to execute the program instructions to perform:
stopping, by the first application process, invoking the second application process.

16. The method according to claim 15, wherein the processor is further configured to execute the program instructions to perform:
sending an eighth request to a fourth application process, wherein the fourth application process corresponds to a fourth application installed on the first device and associated with the second application, and the eighth request is used to request a resource for executing a second response by the first device;
sending, by the fourth application process, a ninth request to the second application process, wherein the fourth application process and the second application process are different processes, and the ninth request is used to request a resource for executing the second response by the first device;
sending, by the second application process, a tenth request to the server corresponding to the second application, wherein the tenth request is used to request a resource for executing the second response by the first device;

receiving, by the second application process, a third resource from the server corresponding to the second application, wherein the third resource is used by the first device to execute the second response;

sending, by the second application process, the third resource to the fourth application process; and executing the second response based on the third resource.

17. A non-transitory readable medium comprising program instructions that, when executed by a processor, cause the processor to:

send a first request to a first application process, wherein the first application process corresponds to a first application installed on the first device, and the first request is used to request a resource for executing a first response by the first device;

send a second request to a first server in response to the first request, wherein the second request is used to request to obtain a second application associated with the first application;

receive the second application from the first server;

send, by the first application process, a third request to a second application process, wherein the second application process corresponds to the second application and is different from the first application process, and the third request is used to request a resource for executing the first response by the first device;

send, by the second application process, a fourth request to a server corresponding to the second application, wherein the fourth request is used to request a resource for executing the first response by the first device;

receive, by the second application process, a first resource from the server corresponding to the second application, wherein the first resource is used by the first device to execute the first response;

send, by the second application process, the first resource to the first application process; and execute the first response based on the first resource.

18. The non-transitory readable medium according to claim 17, wherein the program instructions cause the processor to:

determine, based on the fact that an identifier of the second application does not exist in a bundle manager service (BMS), that the second application is not installed on the first device, wherein the BMS is configured to store an identifier of an application that is installed on the first device.

19. The non-transitory readable medium according to claim 18, wherein the program instructions cause the processor to:

install the second application on the first device, and store the identifier of the second application in the BMS.

20. The method according to claim 17, wherein the second request carries the identifier of the second application.

* * * * *